(12) United States Patent
Yabuki

(10) Patent No.: US 9,111,152 B2
(45) Date of Patent: Aug. 18, 2015

(54) VERIFICATION OBJECT SPECIFYING APPARATUS, VERIFICATION OBJECT SPECIFYING PROGRAM, AND VERIFICATION OBJECT SPECIFYING METHOD

(71) Applicant: FUJITSU FRONTECH LIMITED, Inagi-shi, Tokyo (JP)

(72) Inventor: Maki Yabuki, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 311 days.

(21) Appl. No.: 13/729,896

(22) Filed: Dec. 28, 2012

(65) Prior Publication Data

US 2013/0216095 A1    Aug. 22, 2013

(30) Foreign Application Priority Data

Feb. 17, 2012   (JP) ................................. 2012-033227

(51) Int. Cl.
| | |
|---|---|
| *G06K 9/00* | (2006.01) |
| *G06F 21/30* | (2013.01) |
| *G06F 21/32* | (2013.01) |
| *G06K 9/62* | (2006.01) |
| *H04L 29/06* | (2006.01) |
| *G06F 21/83* | (2013.01) |

(52) U.S. Cl.
CPC ............ *G06K 9/00993* (2013.01); *G06F 21/30* (2013.01); *G06F 21/32* (2013.01); *G06F 21/83* (2013.01); *G06K 9/00006* (2013.01); *G06K 9/6284* (2013.01); *H04L 63/0861* (2013.01); *G06F 2221/2117* (2013.01)

(58) Field of Classification Search
USPC ................................... 382/115–127, 293–301
See application file for complete search history.

(56) References Cited

U.S. PATENT DOCUMENTS

| | | | |
|---|---|---|---|
| 2010/0148922 A1 | 6/2010 | Yamada et al. | |
| 2010/0249573 A1* | 9/2010 | Marks | ............................ 600/411 |
| 2012/0004894 A1* | 1/2012 | Butler et al. | .................... 703/11 |

FOREIGN PATENT DOCUMENTS

| | | |
|---|---|---|
| JP | 2002-329205 A | 11/2002 |
| JP | 2010-035560 A | 2/2010 |
| JP | 2010-092494 A | 4/2010 |
| JP | 2010-146073 A | 7/2010 |
| JP | 2010-157135 A | 7/2010 |

\* cited by examiner

*Primary Examiner* — Shefali Goradia
(74) *Attorney, Agent, or Firm* — Westerman, Hattori, Daniels & Adrian, LLP

(57) ABSTRACT

In a verification object specifying apparatus that specifies a verification object for biometric authentication, a biometric information acquisition unit acquires biometric information from a biometric information source part. An abnormality detection unit detects an abnormal portion in the biometric information source part based on the biometric information. A verification object specifying unit determines whether biometric information located in the abnormal portion is to be included in a verification object, and specifies biometric information to be used as the verification object based on the determination result. The verification object specifying apparatus causes a registration unit to register the biometric information as registration information when serving as a registration apparatus, and causes a verification unit to verify the biometric information against registration information when serving as a verification apparatus.

8 Claims, 26 Drawing Sheets

48a REGISTRATION DATABASE

| USER ID | REGISTRATION DATE | LEFT/ RIGHT | BIOMETRIC INFORMATION | BIOMETRIC INFORMATION ID | WOUND INFORMATION | WOUND INFORMATION ID |
|---|---|---|---|---|---|---|
| u0001 | 2011.2.2 | RIGHT | 100 | S1 | 0 | 0 |
| u0002 | 2011.3.3 | RIGHT | 60 | S101 | 3 | K0001 |
| u0003 | 2011.4.4 | LEFT | 120 | S161 | 0 | 0 |
| u0004 | 2011.5.5 | LEFT | 100 | S261 | 10 | K0004 |
| u0005 | 2011.6.6 | LEFT | 100 | S361 | 0 | 0 |

FIG. 18

48b BIOMETRIC INFORMATION LIST

| BIOMETRIC INFORMATION ID | VECTOR ID | NUMBER OF LINES | P1 | P2 | ... | P20 |
|---|---|---|---|---|---|---|
| S1 | v00001 | 10 | x1a, y1a, t1a | x1b, y1b, t1b | ... | |
| S1 | v00002 | 8 | x2a, y2a, t2a | x2b, y2b, t2b | ... | |
| S1 | v00003 | 20 | x3a, y3a, t3a | x3b, y3b, t3b | ... | x3t, y3t, t3t |
| ... | ... | ... | ... | ... | ... | ... |
| S1 | v00100 | 3 | x100a, y100a, t100a | x100b, y100b, t100b | ... | |
| S101 | v00101 | 12 | x101a, y101a, t101a | x101b, y101b, t101b | ... | |
| ... | ... | ... | ... | ... | ... | ... |

FIG. 19

48c BIOMETRIC INFORMATION LIST

| BIOMETRIC INFORMATION ID | POINT SEQUENCE ID | NUMBER OF POINTS | START | 1st | 2nd | ... | 49th |
|---|---|---|---|---|---|---|---|
| S1 | t00001 | 20 | x1a, y1a | x1b, y1b | x1c, y1c | ... | |
| S1 | t00002 | 16 | x2a, y2a | x2b, y2b | x2c, y2c | ... | |
| S1 | t00003 | 50 | x3a, y3a | x3b, y3b | x3c, y3c | ... | x3ax, y3ax |
| ... | ... | ... | ... | ... | ... | ... | ... |
| S1 | t00100 | 8 | x100a, y100a | x100b, y100b | x100c, y100c | ... | |
| S101 | t00101 | 30 | x101a, y101a | x101b, y101b | x101c, y101c | ... | |
| ... | ... | ... | ... | ... | ... | ... | ... |

FIG. 20

48d WOUND INFORMATION LIST

| WOUND ID | USER ID | ERROR ID | ERROR INFORMATION | NUMBER OF LINES | P1 | P2 | ... |
|---|---|---|---|---|---|---|---|
| K0001 | u0002 | E01 | 70% | 5 | x1a, y1a, t1a | x1b, y1b, t1b | ... |
| K0002 | u0002 | E02 | 200 | 7 | x2a, y2a, t2a | x2b, y2b, t2b | ... |
| K0003 | u0002 | E03 | FF, 00, FF | 3 | x3a, y3a, t3a | x3b, y3b, t3b | ... |
| K0004 | u0004 | E04 | 20 | 2 | x4a, y4a, t4a | x4b, y4b, t4b | ... |
| ... | ... | ... | ... | ... | ... | ... | ... |

FIG. 21

VERIFICATION OBJECT SPECIFYING APPARATUS, VERIFICATION OBJECT SPECIFYING PROGRAM, AND VERIFICATION OBJECT SPECIFYING METHOD

CROSS-REFERENCE TO RELATED APPLICATION

This application is based upon and claims the benefit of priority of the prior Japanese Patent Application No. 2012-033227, filed on Feb. 17, 2012, the entire contents of which are incorporated herein by reference.

FIELD

The embodiments discussed herein are related to a verification object specifying apparatus, a verification object specifying program, and a verification object specifying method.

BACKGROUND

The human body has biometric information that can identify an individual. Some types of biometric information are used for identifying and authenticating an individual. For example, fingerprint, retina, iris, face, vein, and deoxyribonucleic acid (DNA) are known as biometric information that can be used for authentication.

With the recent developments in biometric authentication technologies, various types of individual authentication apparatuses have become available that recognize the characteristics of a living body, i.e., a part of the human body, so as to authenticate an individual. Biometric authentication is performed by comparing biometric information obtained at the time of registration (registration template) with biometric information obtained at the time of authentication so as to determine the authenticity. The accuracy of such authentication using biometric information needs to be further improved in order to improve the usability of the biometric authentication apparatuses.

Some of the factors that reduce the accuracy of authentication using biometric information include aging of living bodies, changes in the ambient environment such as changes in the outside light, and improper operation by a person to be authenticated such as a change in the position of a biometric information source part.

Moreover, since the source from which the information is acquired is a living body, a wound, a state change due a disease or the like, and dirt due to vital activities or daily activities that are present in the biometric information source part might obstruct identification of individuals.

There has been proposed an information processing apparatus that detects a change in a biometric information source part that might obstruct identification of individuals, and excludes a region in which the change is present from a region to be used for verification (see, for example, Japanese Laid-open Patent Publication No. 2002-329205).

However, such a change in the biometric information source part might occur not only at the time of verification, but also at the time of registration. Moreover, such a change in the biometric information source part may be temporary for the living body (such as a wound that heals), or may be permanent to the living body (such as a wound that does not heal, and a congenital abnormality).

SUMMARY

According to an aspect of the invention, there is provided a verification object specifying apparatus that includes a memory configured to store biometric information acquired from a biometric information source part; and one or more processors configured to perform a procedure including the following acts: detecting an abnormal portion in the biometric information source part on the basis of the biometric information, and determining whether biometric information located in the abnormal portion is to be included in a verification object, and specifying biometric information to be used as the verification object on the basis of a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 illustrates an example of a registration database generated by the authentication apparatus according to the second embodiment;

FIG. 19 illustrates an example of a biometric information list generated by the authentication apparatus according to the second embodiment;

FIG. 20 illustrates another example of a biometric information list generated by the authentication apparatus according to the second embodiment;

FIG. 21 illustrates an example of a wound information list generated by the authentication apparatus according to the second embodiment;

DESCRIPTION OF EMBODIMENTS

Figure 1:
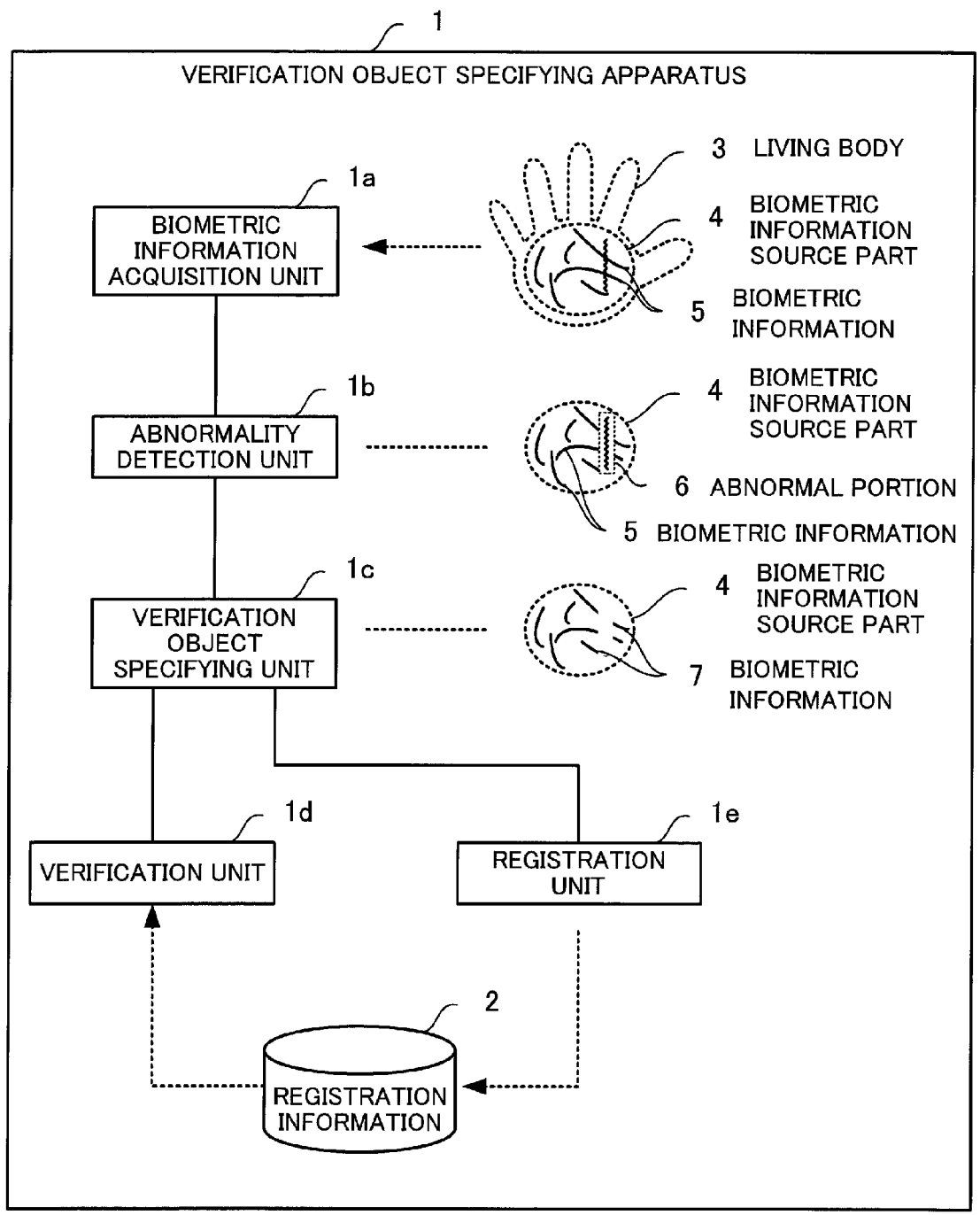
FIG. 1 illustrates the configuration of a verification object specifying apparatus according to a first embodiment.

Several embodiments will be described below with reference to the accompanying drawings, wherein like reference numerals refer to like elements throughout.

(A) First Embodiment

First, a description will be given of a verification object specifying apparatus 1 according to a first embodiment with reference to FIG. 1. FIG. 1 illustrates the configuration of the verification object specifying apparatus 1 according to the first embodiment.

The verification object specifying apparatus 1 is one of authentication apparatuses that perform authentication using biometric information unique to a living body, and specifies a verification object for biometric authentication. The verification object specifying apparatus 1 serves as a registration apparatus by having a registration function of registering, in advance, biometric information to be used for biometric authentication. Also, the verification object specifying apparatus 1 serves as a verification apparatus by having a verification function of verifying biometric information obtained at the time of authentication against biometric information that are registered in advance.

The verification object specifying apparatus 1 includes a biometric information acquisition unit 1a, an abnormality detection unit 1b, and a verification object specifying unit 1c. Further, the verification object specifying apparatus 1 can serve as a verification apparatus by including a verification unit 1d, and can serve as a registration apparatus by including a registration unit 1e.

The biometric information acquisition unit 1a acquires biometric information 5 from the biometric information source part 4. The biometric information 5 is information unique to a living body to be authenticated. The biometric information source part 4 is a part from which the biometric information 5 is acquired. For example, the biometric information acquisition unit 1a may specify the palm of the hand as a biometric information source part 4 of a living body 3, and may specify information about the veins on the palm as biometric information 5.

In some cases, the biometric information acquisition unit 1a acquires, together with the biometric information 5, information about a state change of a living body due to vital activities and daily activities, i.e., abnormality information (such as information about a wound or dirt) that does not belong to biometric information.

It is to be noted that, the biometric information 5 is not limited to information about the veins in the palm. Examples of the biometric information 5 may include other types of information such as information about the fingerprint, the hand print, and the iris. Further, the biometric information source part 4 is not limited to the palm of the hand. Example of the biometric information source part 4 may include other parts such as the sole of the foot, fingers and toes, the back of the hand, the instep of the foot, the wrist, the arm, the chest, and the abdomen. In the case where the information about the veins is used for biometric authentication, the biometric information source part 4 is preferably a portion whose veins can easily be observed in daily life. It is advantageous to select a biometric information source part 4 that allows the part from which the biometric information 5 is acquired to be identified on the basis of the acquired biometric information 5. For example, in the case where the biometric information source part 4 is the palm or the face, it is possible to determine the part from which the biometric information 5 is acquired is the palm or the face on the basis of the acquired image.

The abnormality detection unit 1b detects an abnormal portion 6 in the biometric information source part 4 on the basis of the biometric information 5. In some cases, the biometric information source part 4 includes the abnormal portion 6. The abnormal portion 6 is a portion where a wound, a state change due to a disease or the like, or dirt due to vital activities or daily activities is present, and therefore might obstruct identification of individuals. For example, the abnormal portion 6 is a portion containing a temporary abnormality such as a wound. A temporary abnormality such as a wound results in a difference between the biometric information to be used for authentication that is acquired at the time of registration and the biometric information to be used for authentication that is acquired at the time of verification, which may become a factor of reducing the authentication accuracy.

The verification object specifying unit 1c determines whether information located in the abnormal portion 6 is to be included in a verification object on the basis of predetermined determination criteria (e.g., the position, size, and area of the abnormal portion). Then, the verification object specifying unit 1c specifies biometric information 7 to be used as the verification object on the basis of the determination result. That is, when the verification object specifying unit 1c determines that the information located in the abnormal portion 6 is to be included in a verification object, the verification object specifying unit 1c specifies, as the verification object, the biometric information 7 identical to the biometric information 5. On the hand, when the verification object specifying unit 1c determines that the information located in the abnormal portion 6 is not to be included in a verification object, the verification object specifying unit 1c specifies, as the verification object, the biometric information 7 corresponding to the biometric information 5 excluding the information located in the abnormal portion 6.

It is to be noted that the verification object specifying unit 1c may determine whether to include, as a verification object, the information located in the abnormal portion 6 on the basis of evaluation of the similarity to empirically collected information about the position, size, area, and state of typical wounds and dirt.

When the verification object specifying apparatus 1 serves as a registration apparatus, the verification object specifying apparatus 1 causes the registration unit 1e to register the biometric information 7 as registration information 2. In this way, when the verification object specifying apparatus 1 serves as a registration apparatus, the verification object specifying apparatus 1 specifies the biometric information 7 as a verification object to be used as registration information 2. Thus, the verification object specifying apparatus 1 makes it possible to eliminate the factor of reducing authentication accuracy in the case where the abnormal portion 6 is lost.

When the verification object specifying apparatus 1 serves as a verification apparatus, the verification unit 1d verifies the biometric information 7 against the registration information 2. In this way, when the verification object specifying apparatus 1 serves as a verification apparatus, the verification object specifying apparatus 1 specifies the biometric information 7 as a verification object to be verified against the registration information 2. Thus, the verification object specifying apparatus 1 makes it possible to eliminate the factor of reducing authentication accuracy in the case where the abnormal portion 6 is lost.

In this way, even if there is a change in the biometric information source part, i.e., even if there is a state change in the living body due to vital activities or daily activities, the verification object specifying apparatus 1 prevents a reduction in verification accuracy.

(B) Second Embodiment

Figure 2:
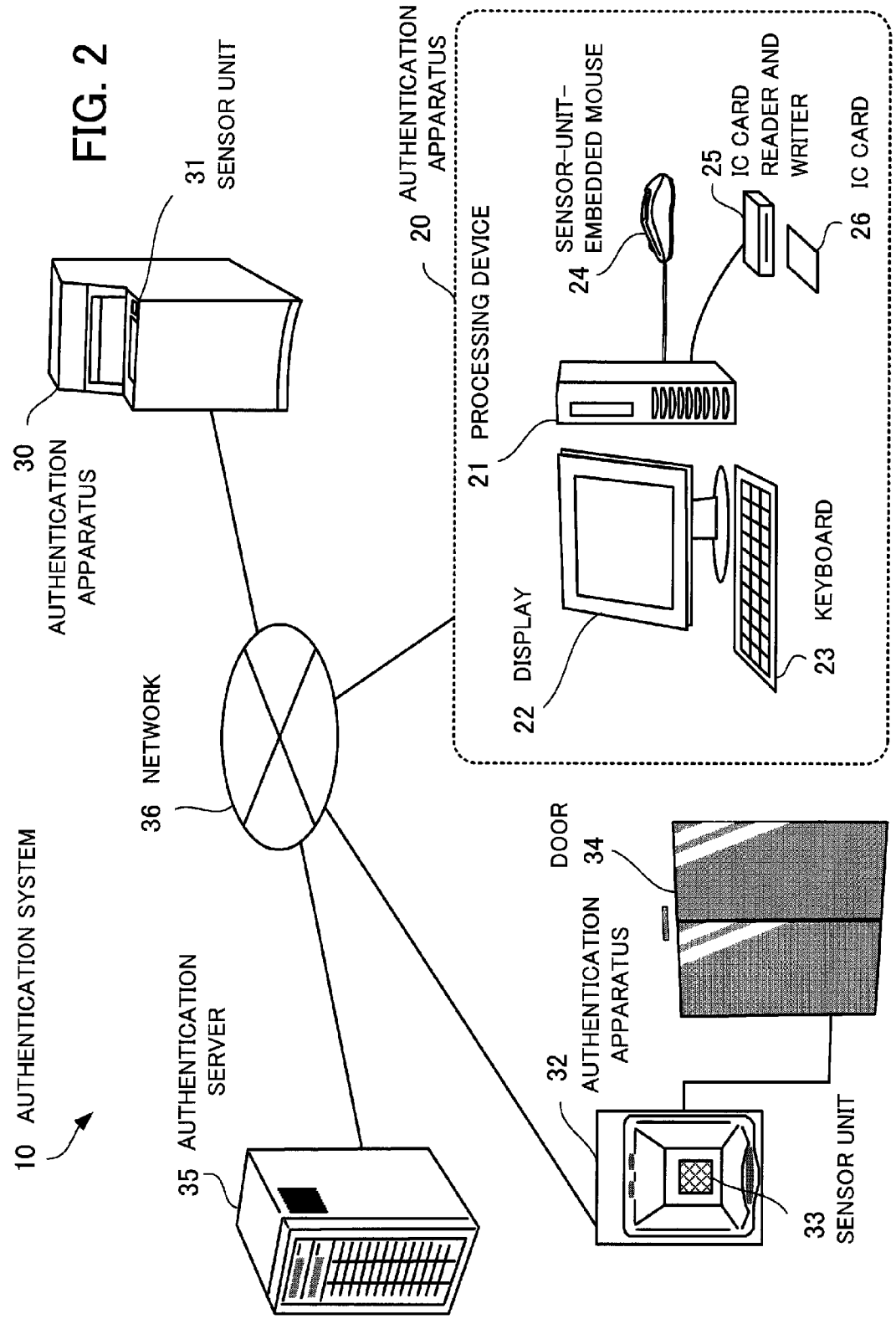
FIG. 2 illustrates the configuration of an authentication system according to a second embodiment.

Next, a description will be given of an authentication system according to a second embodiment. FIG. 2 illustrates the configuration of an authentication system 10 according to the second embodiment. Although a system according to the second embodiment is implemented as the authentication system 10 that performs authentication using palm veins in the second embodiment, the system may be implemented as other systems that perform authentication using the characteristics detected from other parts.

The authentication system 10 is configured to recognize the characteristics of a living body and thereby identify and authenticate an individual. The authentication system 10 may be used for controlling logon to an information system, access to a room, and the like. The authentication system 10 includes an authentication apparatus 20, an authentication apparatus 30, an authentication apparatus 32, an authentication server 35, and a network 36.

The authentication apparatuses 20, 30, and 32 are configured to perform biometric authentication when authenticating a user. More specifically, the authentication apparatus 20 is a computer that performs user authentication, and may be a business-oriented terminal apparatus that needs a high security level, for example. The authentication apparatus 30 is an automated teller machine (ATM) installed in a financial institution. The authentication apparatus 32 is a room access control system that controls access to a security area.

The authentication server 35 stores, in association with each other, an identification information for identifying a user (a person to be authenticated), and preregistered biometric information (a template) that is registered in advance of biometric authentication. The identification information for identifying a user is an identification (ID) that is directly assigned to the user (e.g., a user number) or is indirectly assigned to the user (e.g., an account number). Example of preregistered biometric information may include feature information generated by extracting feature points from image information, and encoded information generated by encoding the image information or the feature information.

The authentication server 35 is a database server of the authentication system 10, and includes various types of databases (e.g., a registration database and a biometric information list which will be described below). The network 36 communicably connects the authentication apparatuses 20, 30, and 32, and the authentication server 35 to each other through wires or by radio. It is to be noted that the authentication apparatuses 20, 30, and 32 may include the various types of databases in place of the authentication server 35.

The authentication apparatus 20 includes a processing device 21, a display 22, and a sensor-unit-embedded mouse 24. The authentication apparatus may further include a keyboard 23, and an integrated circuit (IC) card reader and writer 25 as needed. The sensor-unit-embedded mouse 24 incorporates a sensor unit. The sensor unit includes an imaging device so as to capture an image of the palm of the user's hand, and outputs a vein image to the processing device 21. The IC card reader and writer 25 reads information from and writes information into an IC card 26 of the user. The keyboard 23 and the sensor-unit-embedded mouse 24 receive input operations.

The following describes palm vein authentication performed by the authentication apparatus 20. The user who needs to be authenticated enters identification information for identifying the user (e.g., a user ID) using the keyboard 23, the sensor-unit-embedded mouse 24, or the IC card reader and writer 25. The authentication apparatus 20 prompts, through the display 22, the user to input biometric information. The user inputs biometric information by placing the hand over the sensor-unit-embedded mouse 24. Then, the authentication apparatus 20 inputs a vein image of the palm as biometric information, and verifies the input vein image (biometric information) against a registration template. The registration template may be recorded in a storage unit of the processing device 21, a storage unit in the authentication server 35, or a storage unit in the IC card 26 of the user. In this case, the authentication apparatus 20 serves as an authentication apparatus that performs verification (one-to-one verification) between the biometric information input by the user and the biometric information specified by the identification information.

It is to be noted that the authentication apparatus 20 may perform verification without requesting the user to input the identification information for identifying the user using the keyboard 23, the sensor-unit-embedded mouse 24, or the IC card reader and writer 25. In this case, the authentication apparatus 20 serves as an authentication apparatus that performs verification (one-to-N verification) between the biometric information input by the user and a plurality of pieces of biometric information that are registered in advance.

The authentication apparatus 30 includes a sensor unit 31. The sensor unit 31 includes an imaging device so as to capture an image of the palm of the user's hand. The authentication apparatus 30 performs authentication of the user using a vein image. The authentication apparatus 30 includes an IC card reader and writer (not illustrated), and performs verification using a registration template stored in an IC card (e.g., a cash card with an embedded IC chip). In this case, the authentication apparatus 30 serves as an authentication apparatus that performs one-to-one verification.

The authentication apparatus 32 includes a sensor unit 33. The sensor unit 33 includes an imaging device so as to capture an image of the palm of the user's hand. The authentication apparatus 32 performs authentication of the user using a vein image, and controls opening and closing of a door 34. In this case, the authentication apparatus 32 serves as an authentication apparatus that performs one-to-N verification. It is to be noted that the authentication apparatus 32 may include an identification information input apparatus, such as a numeric keypad and an IC card reader and writer, in addition to the sensor unit 33 so as to serve as an authentication apparatus that performs one-to-one verification.

Figure 3:
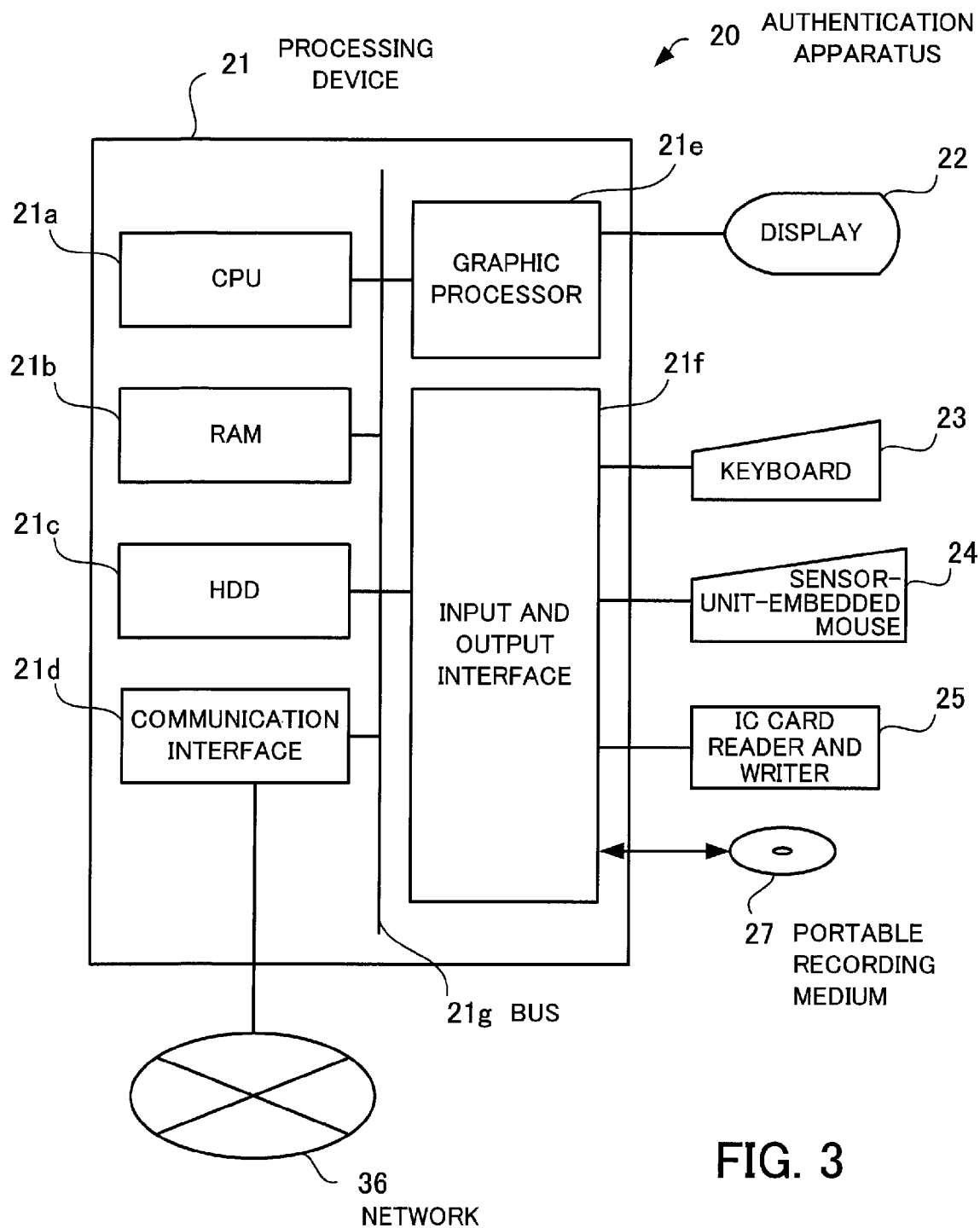
FIG. 3 illustrates an exemplary hardware configuration of the authentication apparatus according to the second embodiment.

Next, a description will be given of an exemplary hardware configuration of the authentication apparatus 20 according to this embodiment, with reference to FIG. 3. FIG. 3 illustrates an exemplary hardware configuration of the authentication apparatus 20 according to the second embodiment.

The authentication apparatus 20 includes the processing device 21, the display 22, the keyboard 23, the sensor-unit-embedded mouse 24, and the IC card reader and writer 25.

The processing device 21 includes one or more central processing units (CPUs) 21a that control the entire operations of the apparatus. The CPU 21a is connected to a random access memory (RAM) 21b, a hard disk drive (HDD) 21c, a communication interface 21d, a graphic processor 21e, and an input and output interface 21f via a bus 21g.

The RAM 21b temporarily stores at least a part of programs of an operating system (OS) and application programs to be executed by the CPU 21a. The RAM 21b also stores various types of data used for operations to be performed by the CPU 21a. The HDD 21c stores the OS and application programs.

The graphic processor 21e is connected to the display 22. The graphic processor 21e displays an image on the screen of the display 22 in accordance with a command from the CPU 21a.

The input and output interface 21f is connected to the keyboard 23, the sensor-unit-embedded mouse 24, and the IC card reader and writer 25. Further, the input and output interface 21f is connectable to a portable recording medium interface that is capable of writing information into a portable recording medium 27 and reading information from the portable recording medium 27. The input and output interface 21f transmits a signal, which is transmitted from the keyboard 23, the sensor-unit-embedded mouse 24, the IC card reader and writer 25, and the portable recording medium interface, to the CPU 21a via the bus 21g.

More specifically, the input and output interface 21f may be connected to the sensor-unit-embedded mouse 24 via a universal serial bus (USB). The processing device 21 receives a vein image from the sensor unit through a USB connection.

The communication interface 21d is connected to the network 36. The communication interface 21d transmits data to and receives data from the authentication server 35.

The processing functions of this embodiment may be realized with the hardware configuration described above. It is to be noted that the authentication apparatus 30, the authentication apparatus 32, and the authentication server 35 may be realized with the same hardware configuration.

The processing device 21 may be formed with modules including a field programmable gate array (FPGA) and a digital signal processor (DSP), respectively, and may be configured without including the CPU 21a. In this case, the processing device 21 includes a non-volatile memory (e.g., electrically erasable and programmable read only memory (EEPROM), flash memory, and flash-memory-based memory card) and stores firmware of the module. The firmware may be written in the non-volatile memory via the portable recording medium 27 or the communication interface 21d. In this way, the firmware of the processing device 21 may be updated by rewriting the firmware stored in the non-volatile memory.

Figure 4:
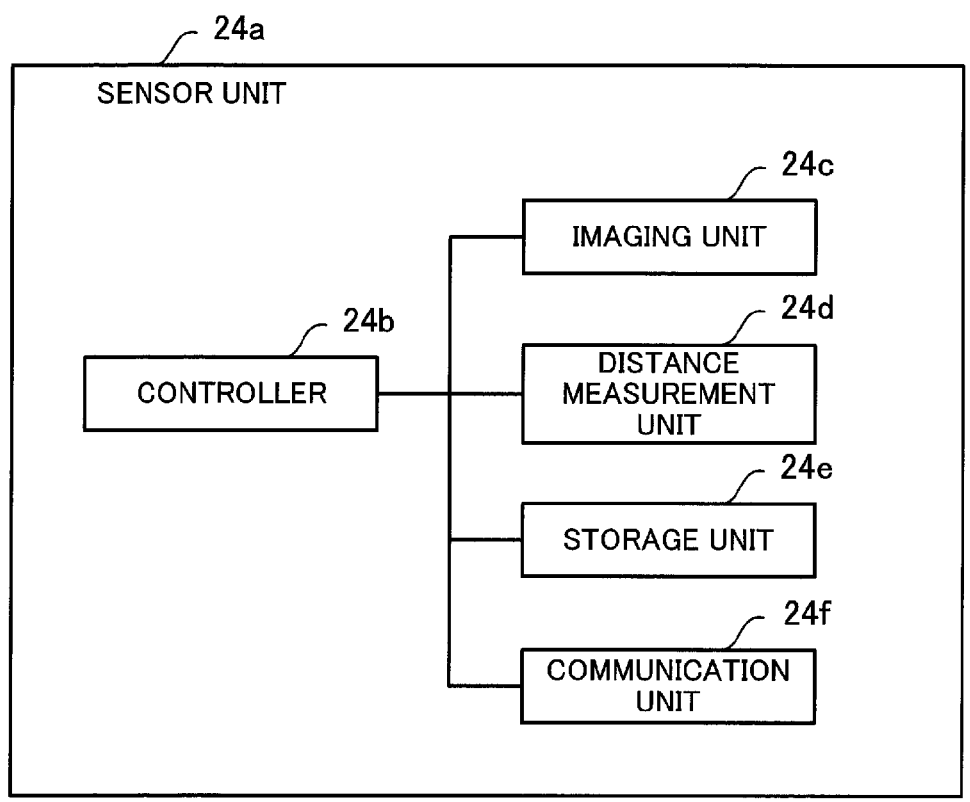
FIG. 4 illustrates the configuration of a sensor unit according to the second embodiment.

Next, a description will be given of the configuration of the sensor-unit-embedded mouse 24 that acquires image information and distance information and outputs the acquired information to the processing device 21, with reference to FIG. 4. FIG. 4 illustrates the configuration of a sensor unit 24a according to the second embodiment. It is to be noted that the sensor units 31 and 33 may have the same configuration as the sensor unit 24a.

The sensor unit 24a is embedded in the sensor-unit-embedded mouse 24. The sensor unit 24a includes a controller 24b, an imaging unit 24c, a distance measurement unit 24d, a storage unit 24e, and a communication unit 24f.

The controller 24b controls the respective processing units. The imaging unit 24c acquires image information from the living body as an imaging object. The imaging unit 24c includes an image sensor (e.g., complementary metal oxide semiconductor (CMOS) sensor, and charge coupled device (CCD) sensor) that captures an image of the living body, a condenser lens, and a plurality of near-infrared light-emitting diodes (LED) that irradiate the imaging object. The near-infrared light-emitting diodes may be provided around the image sensor, and emit near-infrared rays toward the imaging object (upward) such that the image sensor captures an image of the imaging object irradiated with the near-infrared rays. The image sensor may capture a wide field of view so as to include the palm as the imaging object in the imaging area, through the condenser lens (wide angle lens).

The distance measurement unit 24d acquires distance information indicating the distance from the living body as an imaging object. The sensor unit 24a can capture an image of the palm placed within a predetermined range at an imaging timing determined by the distance measurement sensor. The imaging unit 24c may serially capture images at a predetermined timing (e.g., 15 images in one second) such that one or more of the captured vein images is used for determining whether the user has uncertainty in verification.

The storage unit 24e stores the image information acquired by the imaging unit 24c and the distance information acquired by the distance measurement unit 24d in association with each other. The communication unit 24f is connected to the processing device 21 so as to receive an instruction from the processing device 21 and transmit the image information and the distance information.

The image captured by the sensor unit 24a is an image obtained by irradiating the living body (palm) as an imaging object with near-infrared rays and capturing an image of a reflection light therefrom. The hemoglobin in the red blood cells flowing in the veins has lost oxygen. Therefore, this hemoglobin (reduced hemoglobin) absorbs near-infrared rays at wavelengths near 700 through 1,000 nanometers. Accordingly, when near-infrared rays are made incident on the palm, reflection is less only in the areas where veins are present. Thus, the position of the veins can be identified on the basis of the intensity of the reflected near-infrared rays. Use of a predetermined light source makes it easy to extract feature information from the vein image, although the obtained image is achromatic.

Figure 5:
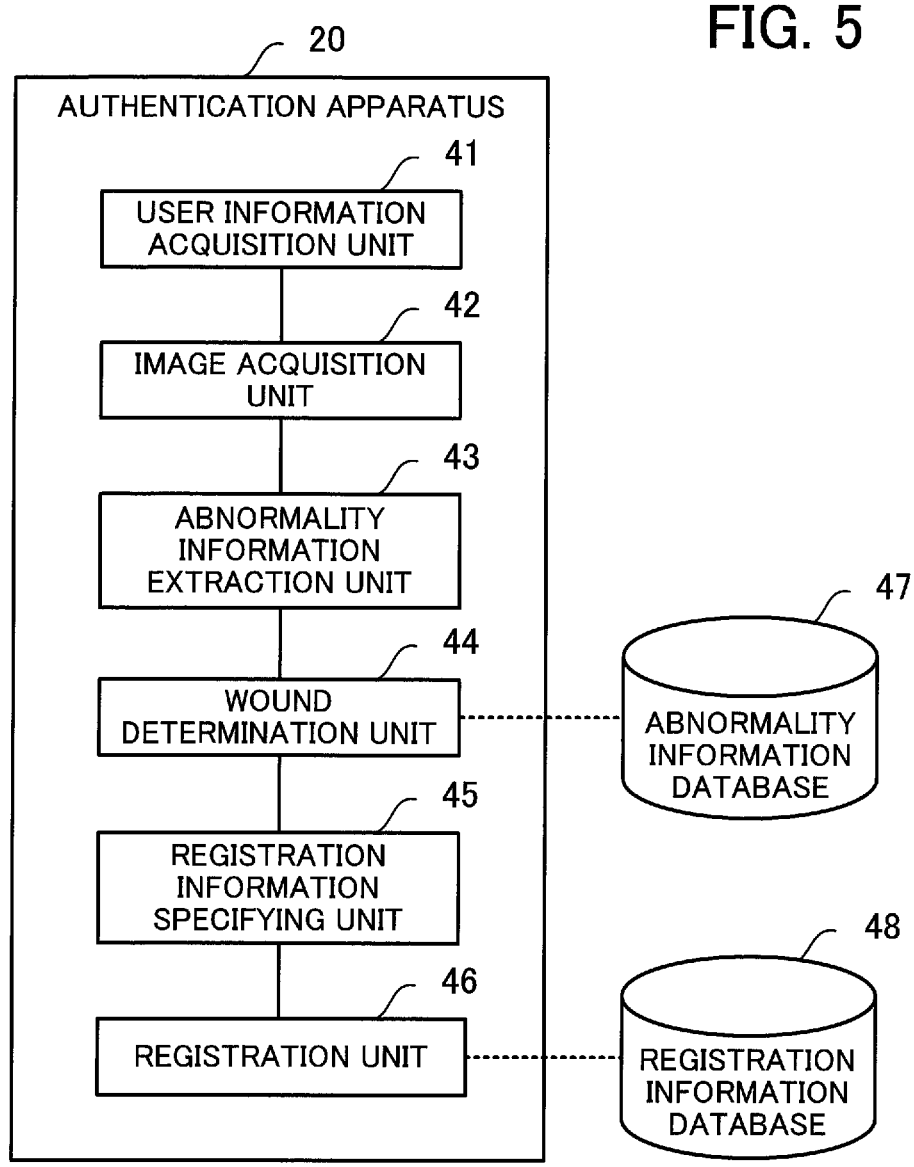
FIG. 5 illustrates the configuration of the authentication apparatus (registration apparatus) according to the second embodiment.
Figure 6:
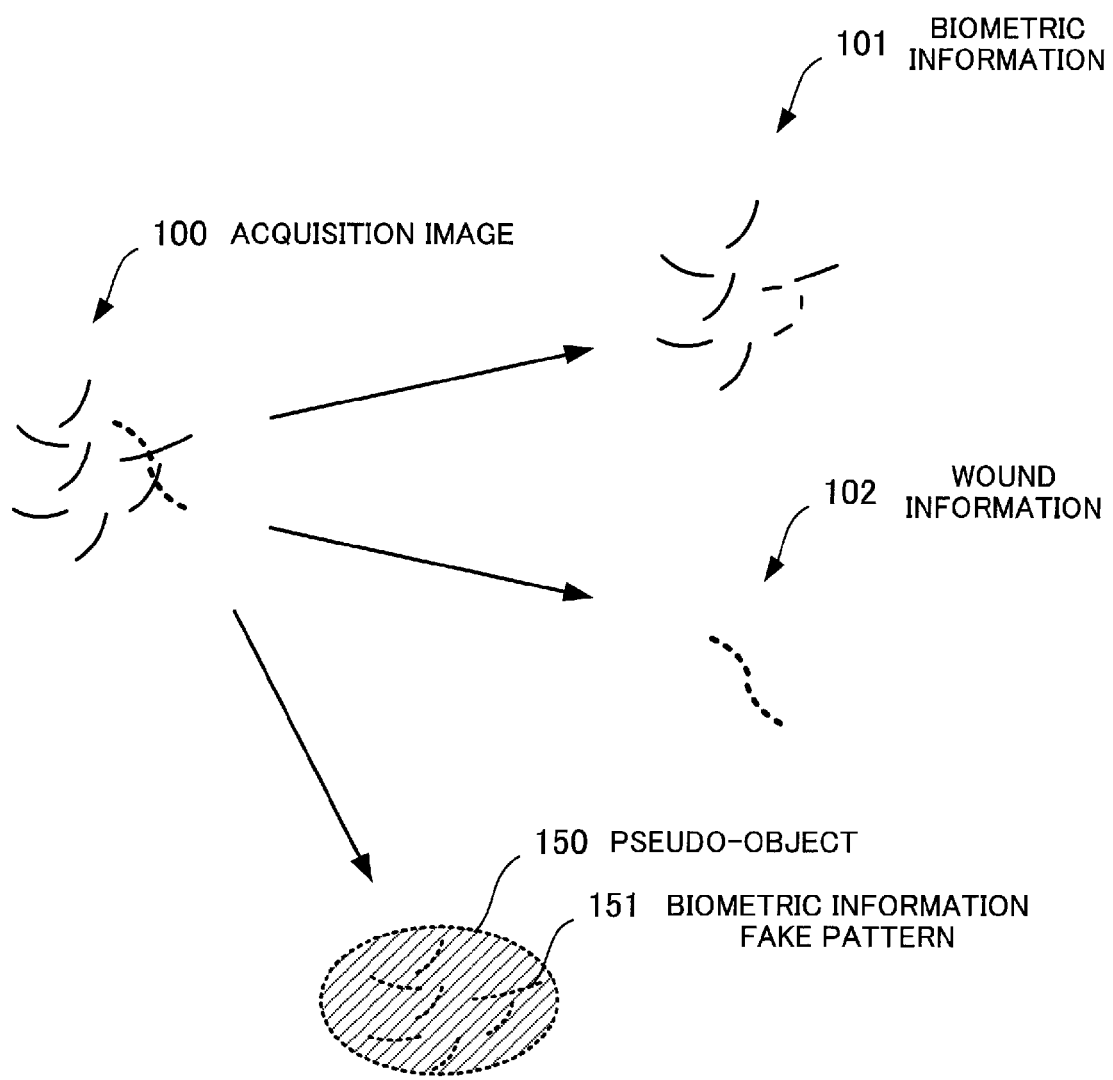
FIG. 6 illustrates an example of extraction of biometric information and wound information according to the second embodiment.

Next, a description will be given of the authentication apparatus 20 serving as a registration apparatus, with reference to FIGS. 5 through 21. First, a description will be given of the configuration of the authentication apparatus 20 that performs a registration operation of registering in advance biometric information to be used for authentication, with reference to FIGS. 5 and 6. FIG. 5 illustrates the configuration of the authentication apparatus 20 (registration apparatus) according to the second embodiment. FIG. 6 illustrates an example of extraction of biometric information and wound information according to the second embodiment.

The authentication apparatus 20 includes a user information acquisition unit 41, an image acquisition unit 42, an abnormality information extraction unit 43, a wound determination unit 44, a registration information specifying unit 45, and a registration unit 46. These processing units may be realized with the hardware configuration illustrated in FIG. 4.

The user information acquisition unit 41 acquires identification information of the user so as to be associated with biometric information to be registered. In the case where there is no need to identify the user, unique information such as a serial number may be acquired. The user information acquisition unit 41 inputs the user information from the keyboard 23, the sensor-unit-embedded mouse 24, and the IC card reader and writer 25.

In order to acquire biometric information to be used for registration, the image acquisition unit 42 captures an image of the palm of the user's hand, and thereby acquires a vein image of the palm. Thus, the authentication apparatus 20 can acquire a vein image (e.g., an acquisition image 100) of the user's hand.

The image acquisition unit 42 captures, one or more times, an image of the palm of the user's hand to be used as biometric information of the user, and thereby acquires one or more images of the veins in the palm of the user's hand. The image acquisition unit 42 can capture an image of the palm of the user's hand by the sensor-unit-embedded mouse 24. For example, the sensor-unit-embedded mouse 24 can capture, at different imaging timings, a plurality of images of the veins in the palm placed over the imaging unit 24c.

Further, in the case where the image acquisition unit 42 captures a plurality of vein images, the image acquisition unit 42 can capture a plurality of vein images while varying the wavelength of the light emitted from the light source to an imaging object. Further, the image acquisition unit 42 can display on the display 22 a guidance message for guiding the imaging object to an imaging position, and thereby guides the imaging object to an appropriate position. Furthermore, the image acquisition unit 42 can receive imaging operations and cancel operations from the keyboard 23 and the sensor-unit-embedded mouse 24.

The abnormality information extraction unit 43 extracts abnormality information which is different from usual biometric information. In other words, the abnormality information extraction unit 43 extracts information that is not biometric information. The abnormality information extraction unit 43 has one or more determination criteria for distinguishing between usual biometric information and abnormality information. For example, in order to extract abnormality information from the captured image of the palm veins, the abnormality information extraction unit 43 performs determination of the luminance histogram, determination of the luminance range, determination of the color range, determination of the wavelength absorption rate, etc. Thus, the abnormality information extraction unit 43 can distinguish between biometric information (solid lines) and abnormality information (broken lines) in an acquisition image 100. With regard to minute wounds, it may be appropriate not to handle minute wounds as wounds. Accordingly, abnormality information to be extracted by the abnormality information extraction unit 43 may be limited to those having a predetermined size.

The wound determination unit 44 determines whether the abnormality information extracted by the abnormality information extraction unit 43 represents a wound. That is, the wound determination unit 44 determines whether the abnormality information extracted by the abnormality information extraction unit 43 represents an abnormality that is temporary for the living body. The wound determination unit 44 may determine the area where the abnormality information is present as a wound area, or may determine the area where the abnormity information and the surrounding area thereof as a wound area. The surrounding area may be an area specified by a preset value (e.g., 10 pixels around the area where abnormality information is present), or may be variable.

The determination of whether the abnormality information represents a wound is made by comparing the feature amount of a known wound pattern (feature information of a captured image containing a wound portion) with the feature amount of the abnormality information. If the abnormality information has a predetermined degree of similarity to the known pattern, the abnormality information is determined to represent a wound. The known wound pattern is stored in an abnormality information database 47 in advance. Thus, the wound determination unit 44 distinguish between biometric information 101 and wound information (abnormality information) 102 in the acquisition image 100. The term "wound" as used herein is not limited to a wound in a limited sense, but includes elements, such as dirt, that become a factor or reducing the authentication accuracy if the abnormality information representing such an element is handled as biometric information.

The abnormality information database 47 may store a pseudo-object pattern for determination of the similarity to a pseudo-object 150 resembling a living body. In this case, the wound determination unit 44 may perform a determination of the similarity to a pseudo-object in addition to a determination of the similarity to a wound. If the wound determination unit 44 determines that abnormality information represents a pseudo-object, the abnormality information extracted by the abnormality information extraction unit 43 or biometric information including the abnormality information may be recognized as pseudo-object information and be excluded from registration information.

It is to be noted that the pseudo-object pattern may have the same feature information and the same feature amount as a pseudo-object image (a captured image containing the pseudo-object). Further, the pseudo-object 150 according to this embodiment is an object to which a fake pattern 151 of biometric information resembling the biometric information 101 is applied. Thus, the authentication apparatus 20 can perform a determination of the similarity to a pseudo-object.

The abnormality information database 47 may be provided in a storage unit (e.g., the HDD 21c) of the authentication apparatus 20, or may be provided in a storage unit (e.g., the authentication server 35, and the IC card 26) outside the authentication apparatus 20.

The registration information specifying unit 45 determines whether the biometric information excluding the abnormality information that is determined to represent a wound by the wound determination unit 44 is usable as registration information. If the biometric information excluding the abnormality information is usable as registration information, the registration information specifying unit 45 specifies the biometric information excluding the abnormality information as registration information. The registration information specifying unit 45 has one or more determination criteria for determining whether biometric information excluding abnormality information is usable as registration information. For example, the registration information specifying unit 45 determines whether biometric information excluding abnormality information has a predetermined information amount (e.g., a preset information amount), and determines whether the excluded abnormality information has a predetermined proportion (e.g., a preset proportion) in the biometric information before the exclusion of the abnormality information. Thus, the registration information specifying unit 45 can determine whether the biometric information excluding the abnormality information is qualified to be registration information.

The registration unit 46 registers the registration information specified by the registration information specifying unit 45 in a registration information database 48. The registration information database 48 may be provided in a storage unit (e.g., the HDD 21c) of the authentication apparatus 20, or may be provided in a storage unit (e.g., the authentication server 35, and the IC card 26) outside the authentication apparatus 20.

In this way, even if there is a change in the biometric information source part, the authentication apparatus 20 can register registration information that makes it possible to prevent a reduction in verification accuracy.

In the above description, the wound determination unit 44 of the authentication apparatus 20 determines the similarity to a wound by comparing the abnormality information to a known wound pattern. However, the wound determination unit 44 may present an area of the abnormality information to the user so as to determine whether the area of the abnormality information includes a wound on the basis of self-reporting by the user. That is, in this case, the authentication apparatus 20 includes a presentation unit that presents a candidate wound to the user, and a response reception unit that receives a response from the user. Thus, the authentication apparatus 20 can improve the convenience of biometric authentication while preventing a reduction in verification accuracy.

The wound determination unit 44 may present an area of the abnormality information to a third party (e.g., a person who can judge the validity of registration information, such as a bank teller) other than the user so as to determine whether the area of the abnormality information includes a wound on the basis of approval of a wound by the third party. That is, in this case, the authentication apparatus 20 includes a presentation unit that presents a candidate wound to the third party, and an approval reception unit that receives an approval from the third party. Thus, the authentication apparatus 20 can improve the convenience of biometric authentication while preventing a reduction in verification accuracy and preventing fraud by the user.

Figure 7:
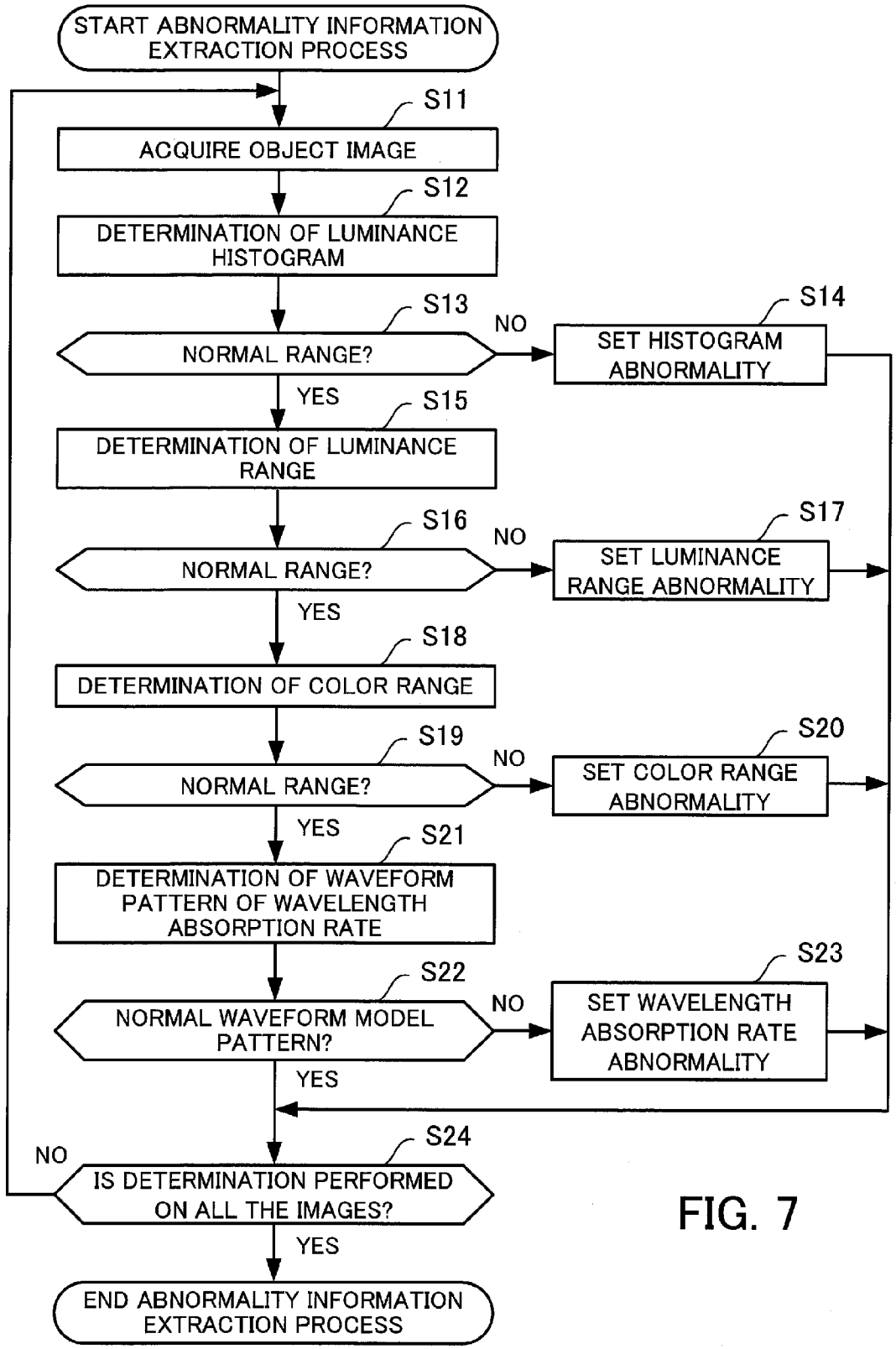
FIG. 7 is a flowchart illustrating an abnormality information extraction process performed by the authentication apparatus according to the second embodiment.
Figure 8:
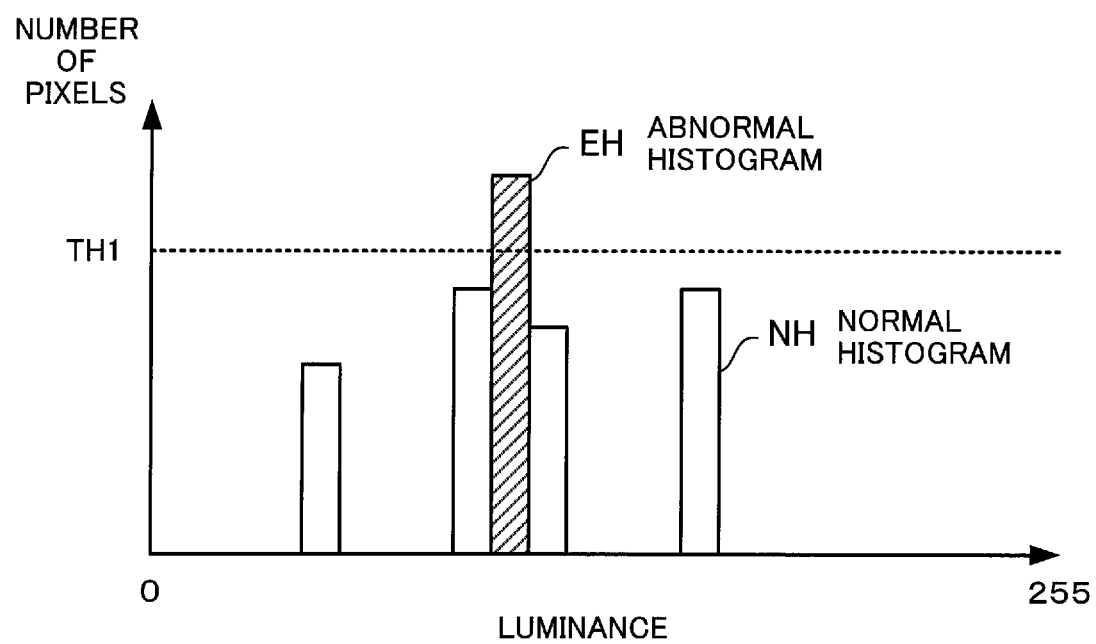
FIG. 8 illustrates an example of determination of the luminance histogram according to the second embodiment.
Figure 9:
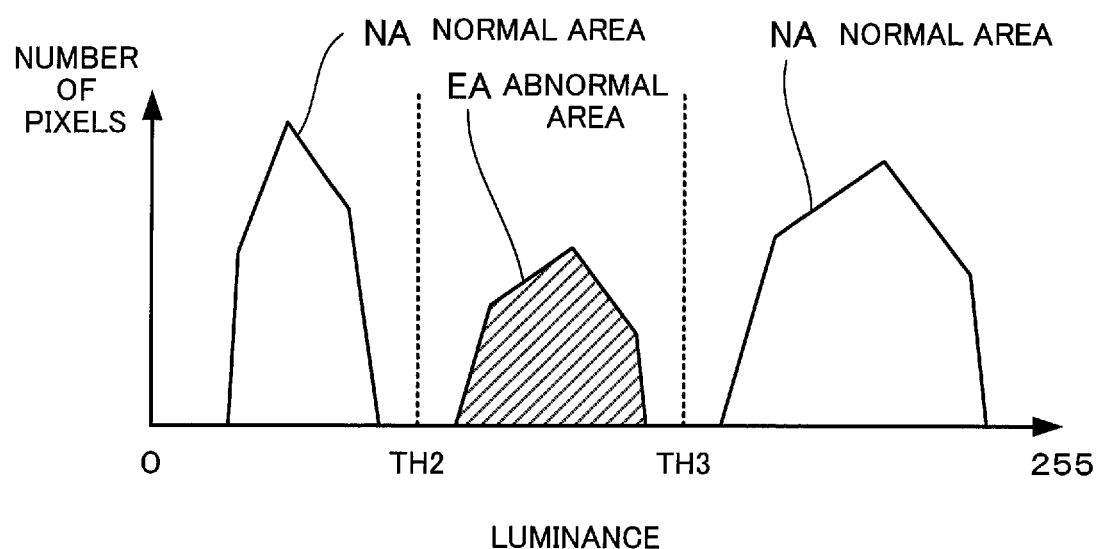
FIG. 9 illustrates an example of determination of the luminance range according to the second embodiment.
Figure 10:
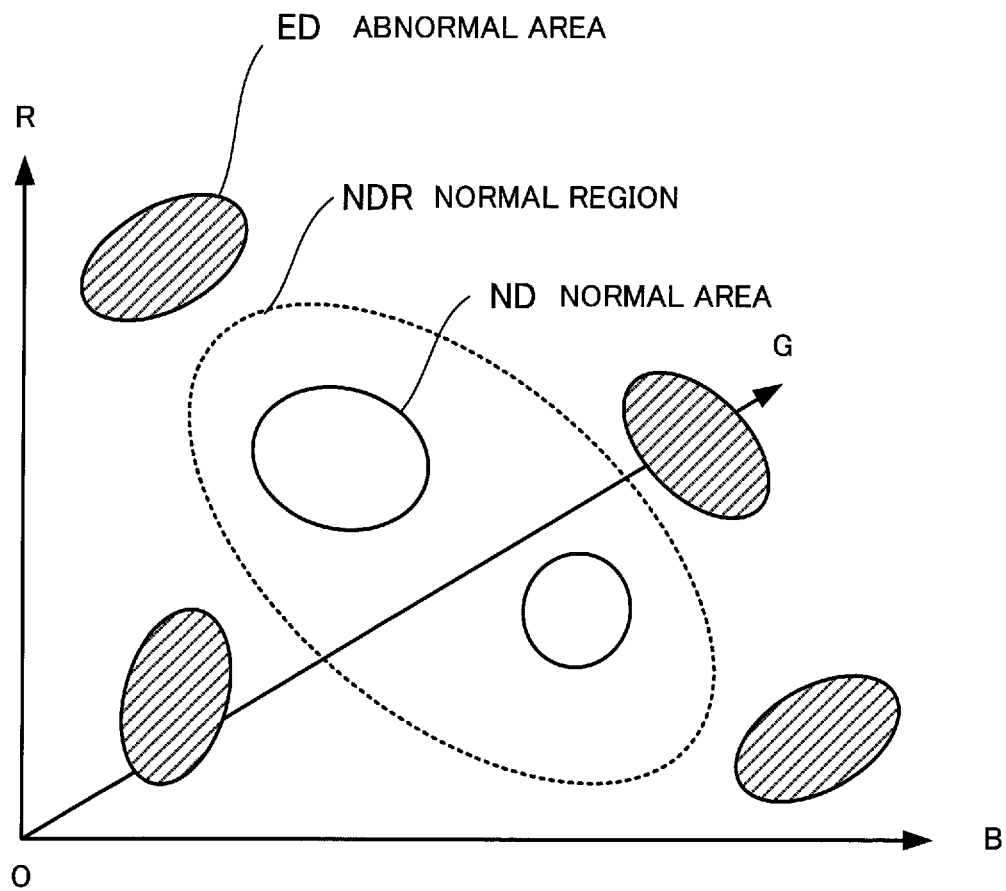
FIG. 10 illustrates an example of determination of the color range according to the second embodiment.
Figure 11:
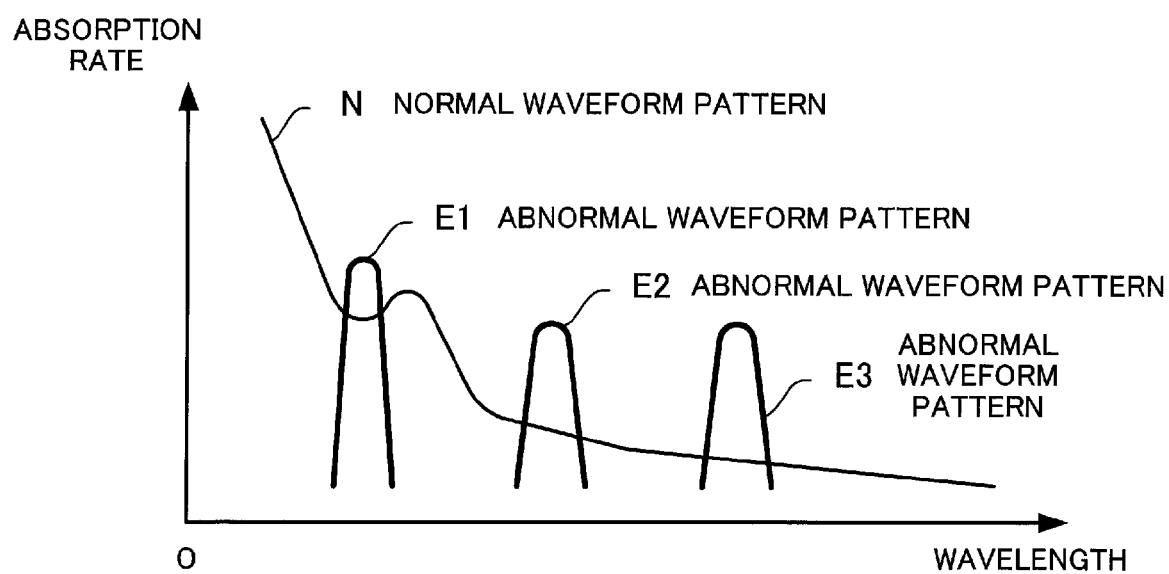
FIG. 11 illustrates an example of determination of the wavelength absorption rate according to the second embodiment.

Next, a description will be given of an abnormality information extraction process performed by the abnormality information extraction unit 43, with reference to FIGS. 7 through 11. FIG. 7 is a flowchart illustrating an abnormality information extraction process performed by the authentication apparatus 20 according to the second embodiment. FIG. 8 illustrates an example of determination of the luminance histogram according to the second embodiment. FIG. 9 illustrates an example of determination of the luminance range according to the second embodiment. FIG. 10 illustrates an example of determination of the color range according to the second embodiment. FIG. 11 illustrates an example of determination of the wavelength absorption rate according to the second embodiment.

The abnormality information extraction process is a process performed by the abnormality information extraction unit 43 after the image acquisition unit 42 acquires an image to be used for generation of registration information.

(Step S11) The abnormality information extraction unit 43 acquires an image (object image) to be subjected to extraction of abnormality information.

(Step S12) The abnormality information extraction unit 43 performs a determination of the luminance histogram on the acquired object image. More specifically, the abnormality information extraction unit 43 performs a determination of the luminance histogram by determining whether the number of pixels of each of 256 luminance levels (luminance levels 0 through 255) in a predetermined area of the object image is greater than a preset threshold. For example, the number of pixels in an abnormal histogram EH is greater than a threshold TH1, and therefore the abnormal histogram EH is determined to be abnormality information. On the other hand, the number of pixels in a normal histogram NH is not greater than the threshold TH1, and therefore the normal histogram NH is determined not to be abnormality information (see FIG. 8). The threshold TH1 does not need to have the same value for all the luminance levels, and may be set for each luminance level. It is to be noted that the value of the threshold TH1 may vary in accordance with the acquired object image (e.g., the average luminance of the image, the wavelength of the light source used at the time of imaging).

(Step S13) If the abnormality information extraction unit 43 determines that the histogram of each luminance level of the acquired object image is equal to or less than the threshold TH1, i.e., if the histogram is in the normal range, the process proceeds to Step S15. On the other hand, if the abnormality information extraction unit 43 determines that the histogram is not in the normal range, the process proceeds to Step S14.

(Step S14) The abnormality information extraction unit 43 sets a histogram abnormality to the acquired object image.

(Step S15) The abnormality information extraction unit 43 performs a determination of the luminance range on the acquired object image. More specifically, the abnormality information extraction unit 43 performs a determination of the luminance range by determining whether the pixel distribution in each of 256 luminance levels (luminance levels 0 through 255) in the predetermined area of the object image is in a preset luminance range. For example, the pixel distribution of an abnormal area EA is in a range between a threshold TH2 and a threshold TH3, and therefore the abnormal area EA is determined to be abnormality information. On the other hand, the pixel distribution of a normal area NA is in the range between the threshold TH2 and the threshold TH3, and therefore the normal area NA is determined not to be abnormality information (see FIG. 9). It is to be noted that the values of the thresholds TH2 and TH3 may vary in accordance with the acquired object image (e.g., the average luminance of the image, the wavelength of the light source used at the time of imaging).

(Step S16) If the abnormality information extraction unit 43 determines that the luminance distribution of the acquired object image is in the range between the threshold TH2 and the threshold TH3, i.e., if the luminance distribution is not in the normal range, the process proceeds to Step S17. On the other hand, if the abnormality information extraction unit 43 determines that the luminance distribution is in the normal range, the process proceeds to Step S18.

(Step S17) The abnormality information extraction unit 43 sets a luminance range abnormality to the acquired object image.

(Step S18) The abnormality information extraction unit 43 performs a determination of the color range on the acquired object image. More specifically, the abnormality information extraction unit 43 performs a determination of the color range by determining whether the ratio of RGB components in the predetermined area of the object image is in a preset normal region NDR. For example, the ratio of RGB components of an abnormal area ED is outside the normal region NDR, and therefore the abnormal area ED is determined to be abnormality information. On the other hand, the ratio of RGB components of a normal area ND is in the normal region NDR, and therefore the normal area ND is determined not to be abnormality information (see FIG. 10). It is to be noted that the normal region NDR may vary in accordance with the acquired object image (e.g., the average luminance of the image, the wavelength of the light source used at the time of imaging).

(Step S19) If the abnormality information extraction unit 43 determines that the ratio of RGB components in the predetermined area of the acquired object image is not in the normal region NDR, i.e., if the ratio of RGB components is not in the normal range, the process proceeds to Step S20. On the other hand, if the abnormality information extraction unit 43 determines that the ratio of RGB components is in the normal range, the process proceeds to Step S21.

(Step S20) The abnormality information extraction unit 43 sets a color range abnormality to the acquired object image.

(Step S21) The abnormality information extraction unit 43 performs a determination of the waveform pattern of the wavelength absorption rate on the acquired object image. More specifically, the abnormality information extraction unit 43 performs a determination of the waveform pattern of the wavelength absorption rate by determining whether the absorption rate of each wavelength component of the light in the predetermined area of the object image approximates a preset waveform model pattern. For example, abnormal waveform patterns E1, E2, and E3 have waveform patterns of the wavelength absorption rate that do not approximate a preset normal waveform model pattern, and therefore are determined to be abnormality information. On the other hand, a waveform pattern N has a waveform pattern of the wavelength absorption rate that approximates the preset normal waveform model pattern, and therefore is determined not to be abnormality information (see FIG. 11). It is to be noted that the authentication apparatus 20 may set an abnormal waveform model pattern in place of the normal waveform model pattern. Further, the normal waveform model pattern may vary in accordance with the acquired object image (e.g., the average luminance of the image, the wavelength of the light source used at the time of imaging).

(Step S22) If the abnormality information extraction unit 43 determines that the waveform pattern of the wavelength absorption rate does not approximate the preset normal waveform model pattern, the process proceeds to Step S23. On the other hand, if the abnormality information extraction unit 43 determines that the waveform pattern is in a range of the normal waveform model pattern, the process proceeds to Step S24.

(Step S23) The abnormality information extraction unit 43 sets a wavelength absorption rate abnormality to the acquired object image.

(Step S24) The abnormality information extraction unit 43 determines whether abnormality determination is performed on all the images (object images) to be subject to extraction of abnormality information. If the abnormality information extraction unit 43 determines that abnormality determination is not performed on all the images, the process proceeds to Step S11. On the other hand, if the abnormality information extraction unit 43 determines that abnormality determination is performed on all the images, the abnormality information extraction process is ended.

As described above, if the abnormality information extraction unit 43 detects an abnormality in any of a determination of the luminance histogram, a determination of the luminance range, a determination of the color range, and a determination of the waveform pattern of the wavelength absorption rate in the abnormality information extraction process, the abnormality information extraction unit 43 does not perform the other determinations. Accordingly, it is possible to perform an abnormality determination at high speed. It is to be noted that, in order to perform the abnormality determination with high accuracy in the abnormality information extraction process, the abnormality information extraction unit 43 may perform all the abnormality determinations regardless of whether an abnormality is detected in any of the abnormality determinations. Further, when the abnormality information extraction unit 43 performs a determination of the luminance histogram, a determination of the luminance range, a determination of the color range, and a determination of the waveform pattern of the wavelength absorption rate in the abnormality information extraction process, the abnormality information extraction unit 43 may perform a determination of the similarity to a pseudo-object resembling a living body.

Figure 12:
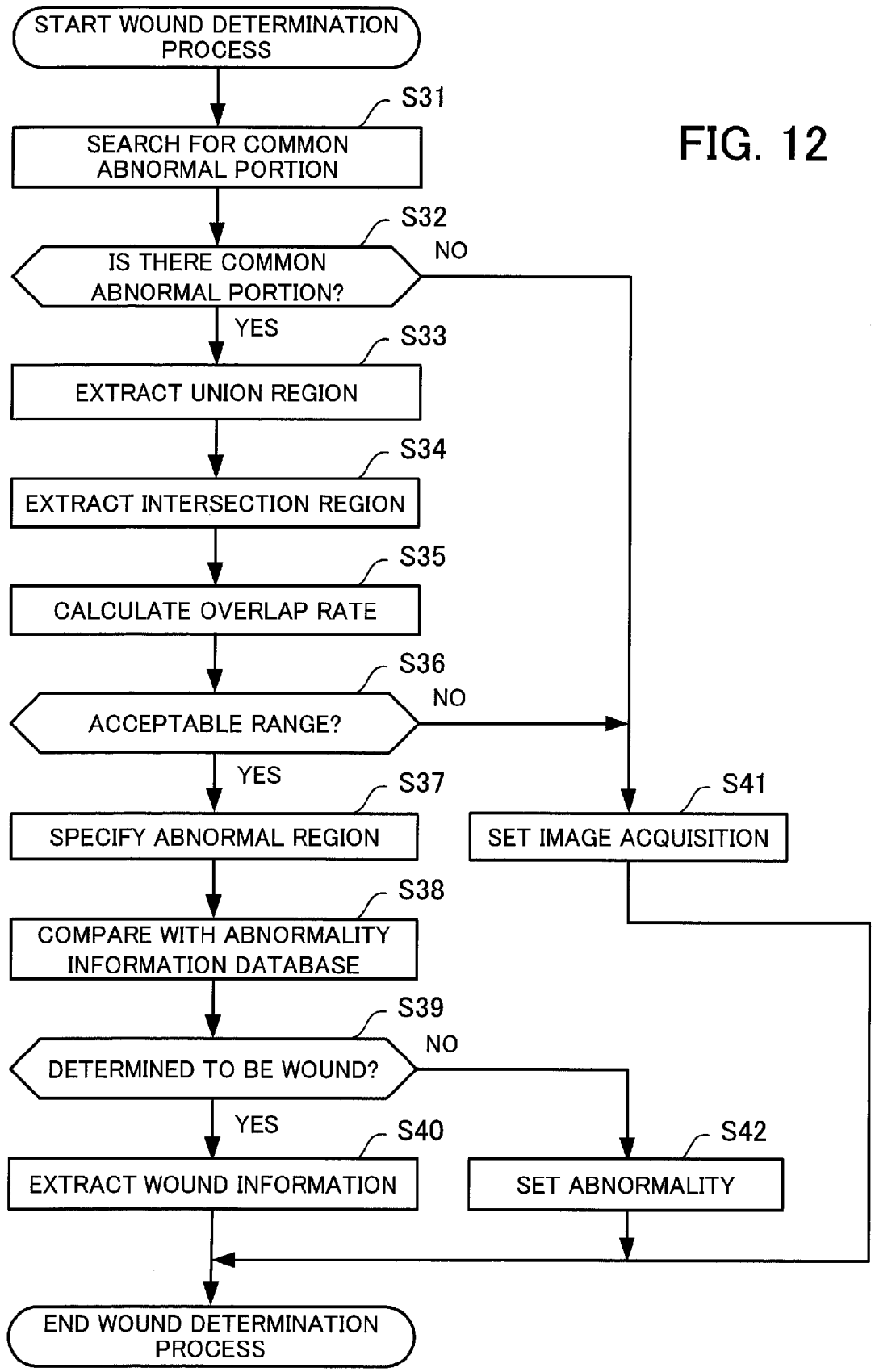
FIG. 12 is a flowchart illustrating a wound determination process performed by the authentication apparatus according to the second embodiment.
Figure 13:
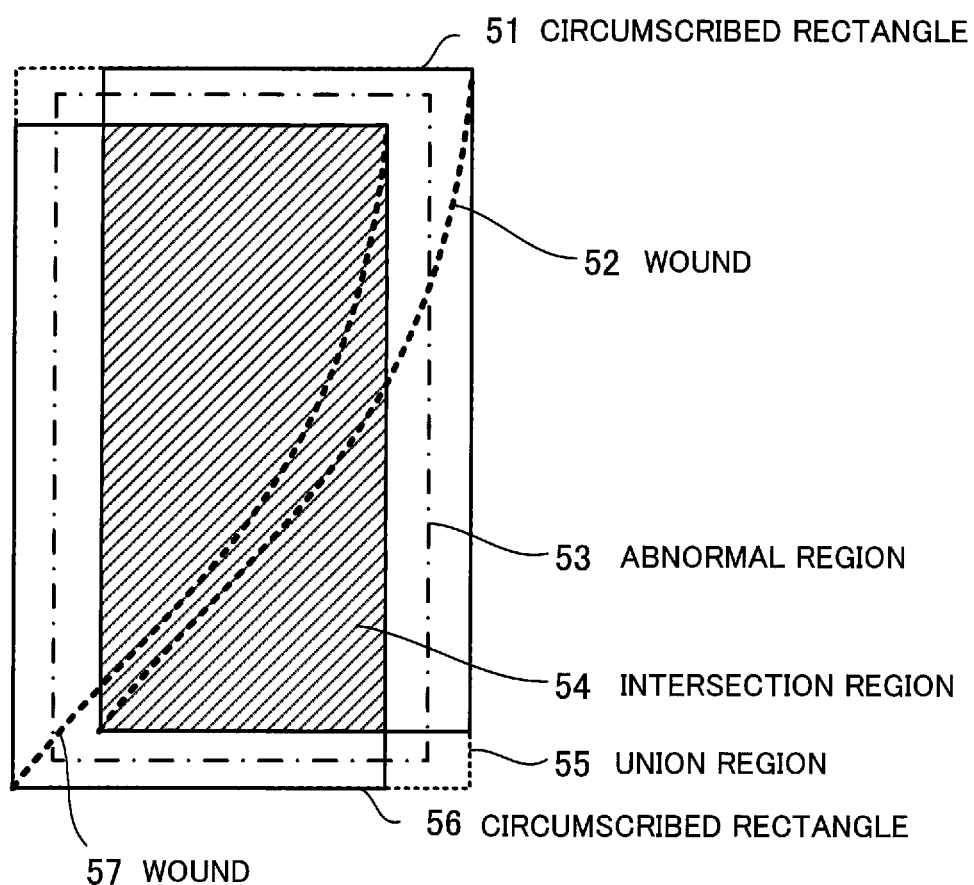
FIG. 13 illustrates an example of specifying an abnormal region in the wound determination process according to the second embodiment.
Figure 14:
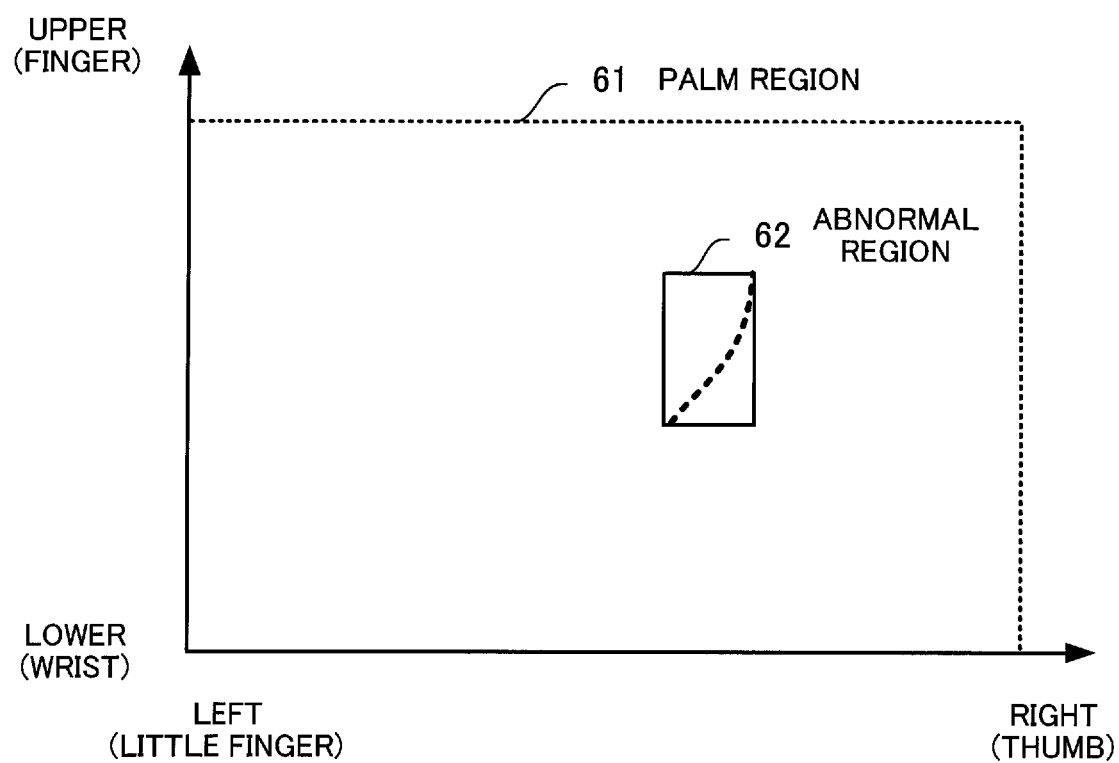
FIG. 14 illustrates an example of wound information extraction according to the second embodiment.
Figure 15:
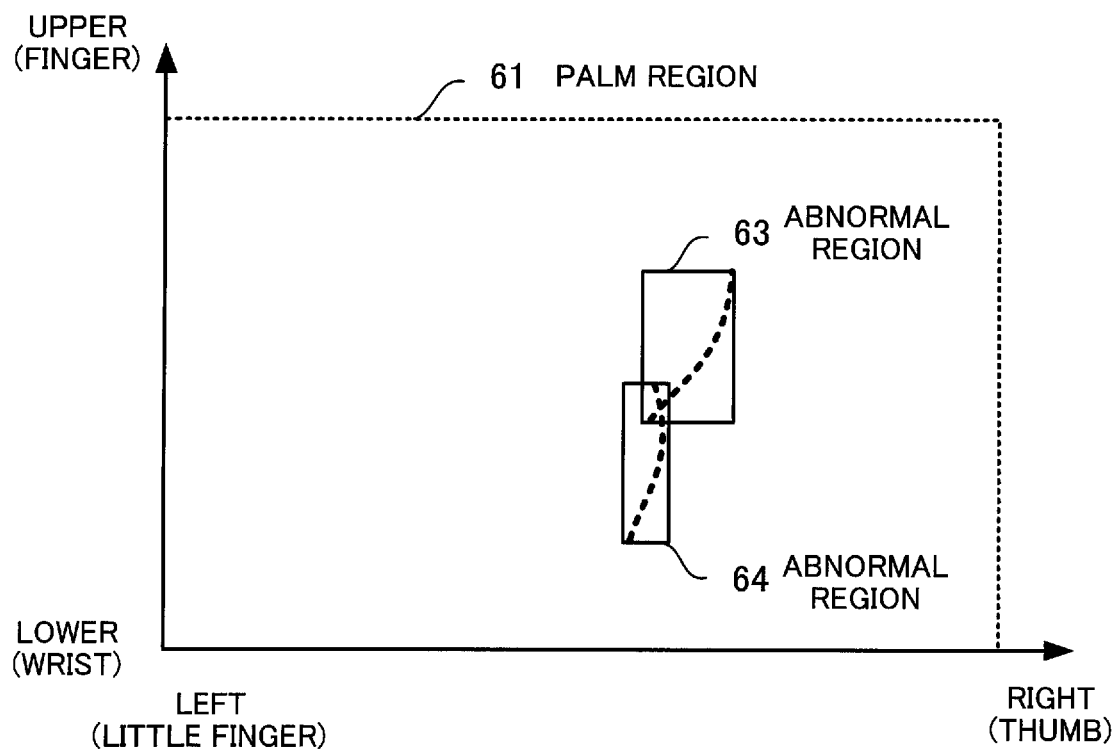
FIG. 15 illustrates another example of wound information extraction according to the second embodiment.
Figure 16:
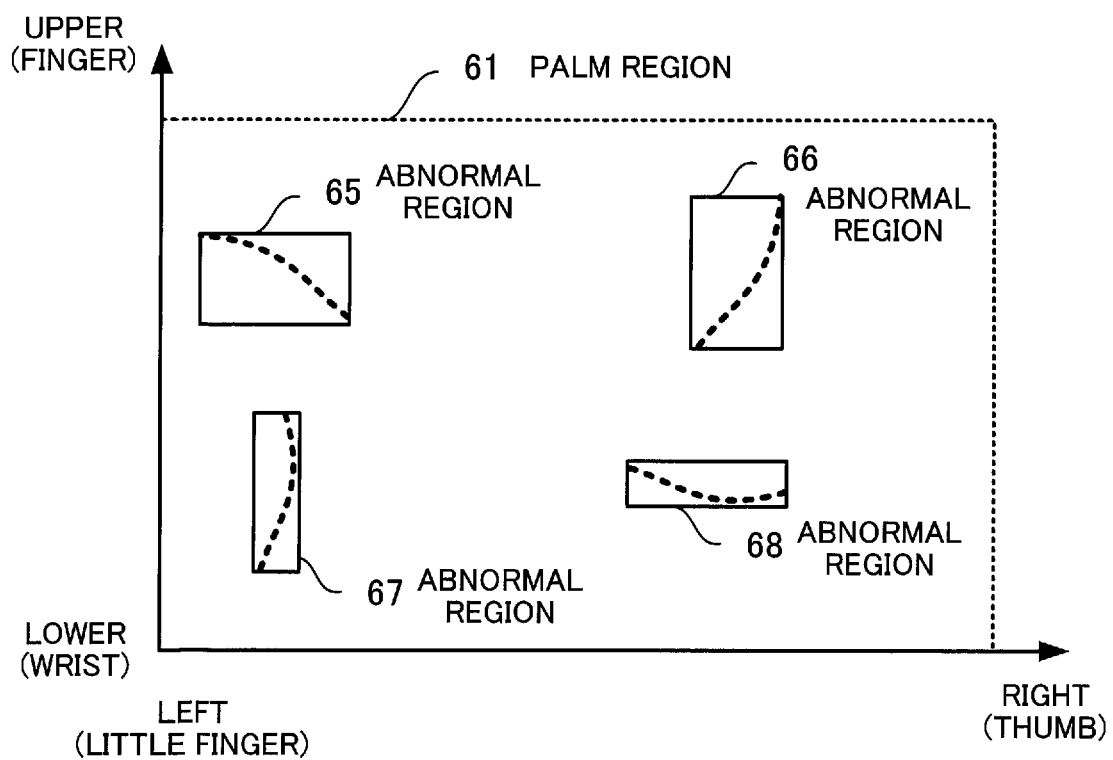
FIG. 16 illustrates still another example of wound information extraction according to the second embodiment.

Next, a description will be given of a wound determination process performed by the wound determination unit 44, with reference to FIGS. 12 through 16. FIG. 12 is a flowchart illustrating a wound determination process performed by the authentication apparatus 20 according to the second embodiment. FIG. 13 illustrates an example of specifying an abnormal region in the wound determination process according to the second embodiment. FIGS. 14 through 16 illustrate still examples of wound information extraction according to the second embodiment.

The wound determination process is a process performed by the wound determination unit 44 after the abnormality information extraction unit 43 extracts abnormality information.

(Step S31) The wound determination unit 44 searches for abnormal portions of a common region among the images that are subjected to extraction of abnormality information in the abnormality information extraction process.

(Step S32) The wound determination unit 44 determines whether there is a common abnormal portion among a plurality of images. If the wound determination unit 44 determines that there is a common abnormal portion among the plurality of images, the process proceeds to Step S33. On the other hand, if the wound determination unit 44 determines that there is no common abnormal portion among the plurality of images, the process proceeds to Step S41.

For example, in the case where there are two images: one includes a circumscribed rectangle 51 of a wound 52 as an abnormal portion and the other includes a circumscribed rectangle 56 of a wound 57, if the circumscribed rectangle 51 and the circumscribed rectangle 56 match each other, the wound determination unit 44 determines that the two images have a common abnormal portion (FIG. 13).

(Step S33) The wound determination unit 44 extracts a union region that includes at least one of the common abnormal portions. For example, in the case where there are two images: one includes a circumscribed rectangle 51 of a wound 52 as an abnormal portion, and the other includes a circumscribed rectangle 56 of a wound 57, the wound determination unit 44 extracts a union region 55 (indicated by the broken lines in FIG. 13) that includes at least one.

(Step S34) The wound determination unit 44 extracts an intersection region that includes both the common abnormal portions. For example, in the case where there are two images: one includes a circumscribed rectangle 51 of a wound 52 as an abnormal portion, and the other includes a circumscribed rectangle 56 of a wound 57, the wound determination unit 44 extracts an intersection region 54 (indicated by hatching in FIG. 13).

(Step S35) The wound determination unit 44 calculates the proportion of the intersection region 54 in the union region 55 as an overlap rate.

(Step S36) The wound determination unit 44 determines whether the overlap rate is in a preset acceptable range. If the wound determination unit 44 determines that the overlap rate is in the acceptable range, the process proceeds to Step S37. On the other hand, if the wound determination unit 44 determines that the overlap rate is not in the acceptable range, the process proceeds to Step S41. If the overlap rate between the images that are subjected to extraction of abnormality information in the abnormality information extraction process is in the acceptable range, the images are determined to have a common region. For example, in the case where the overlap rate between the circumscribed rectangle 51 and the circumscribed rectangle 56 is substantially small, the wound determination unit 44 determines that the wound 52 and the wound 57 are not a common abnormal portion.

(Step S37) The wound determination unit 44 specifies an intermediate area between the intersection region 54 and the union region 55 as an abnormal region. For example, in the case where there are two images: one includes a circumscribed rectangle 51 of a wound 52 as an abnormal portion, and the other includes a circumscribed rectangle 56 of a wound 57, the wound determination unit 44 specifies an abnormal region 53 (indicated by the one-dot chain line in FIG. 13).

(Step S38) The wound determination unit 44 compares a wound pattern contained in the abnormal region 53 to a known wound pattern stored in the abnormality information database 47.

(Step S39) The wound determination unit 44 determines the similarity to a wound on the basis of the degree of agreement between the wound pattern contained in the abnormal region 53 and the known wound pattern stored in the abnormality information database 47. For example, the wound determination unit 44 may determine the similarity to a wound by comparing an evaluation value calculated using a predetermined evaluation function to a preset threshold. If the wound determination unit 44 determines that the wound pattern contained in the abnormal region 53 is a wound, the process proceeds to Step S40. On the other hand, if the wound determination unit 44 determines that the wound pattern is not a wound, the process proceeds to Step S42.

(Step S40) The wound determination unit 44 extracts wound information (abnormality information determined to represent a wound). After the wound determination unit 44 extracts wound information, the wound determination process is ended. The wound information is information about a wound. For example, the wound information includes information that specifies the position in the biometric information source part, the size, and the abnormal state. More specifically, the wound information includes information that specifies the size and position of an abnormal region 62 in a palm region 61 representing the palm in a rectangle (indicated by the broken lines in FIG. 14). For example, the position and magnitude of a vector the abnormal region 62 may be represented by the direction and the size of a vector pointing from the upper left corner to the lower right corner.

Although the wound determination unit 44 extracts only one piece of wound information in the example of FIG. 14, the wound determination unit 44 may extract a plurality of pieces of wound information. For example, the wound determination unit 44 may extract abnormal regions 63 and 64 that partially overlap each other in the palm region 61 (FIG. 15). Also, the wound determination unit 44 may extract abnormal regions 65, 66, 67, and 68 that are dispersed in the palm region 61 (FIG. 16).

(Step S41) Since the wound determination unit 44 determines that there are no abnormal portions of a common region among the images that are subjected to extraction of abnormality information in the abnormality information extraction process, image acquisition by the image acquisition unit 42 is set again, and the wound determination process is ended.

(Step S42) The wound determination unit 44 sets information indicating the presence of an abnormality, i.e., a wound pattern determined not to be a wound, and the wound determination process is ended. When the information indicating the presence of an abnormality is set, the authentication apparatus 20 may notify the user or the administrator of the abnormality, for example.

Figure 17:
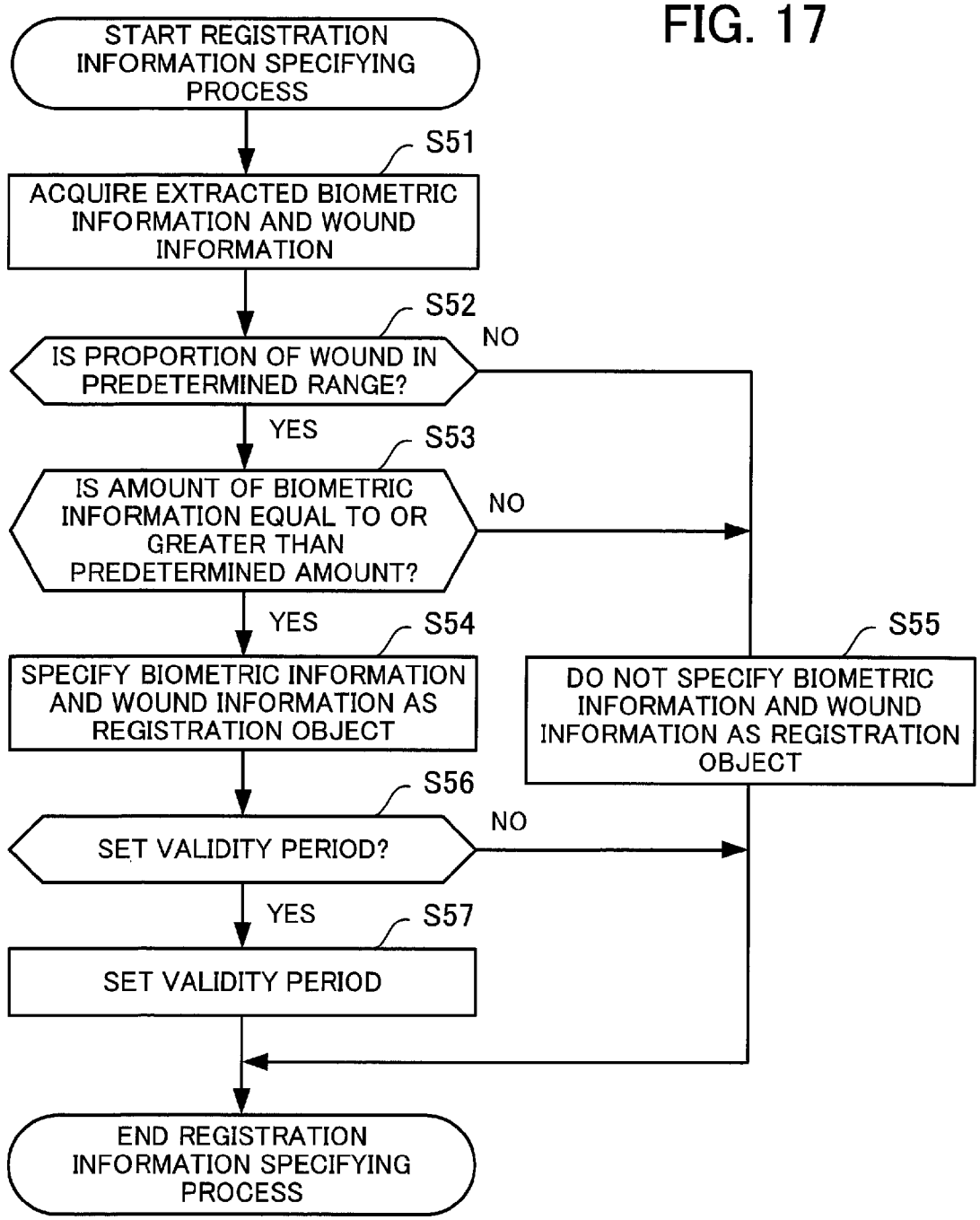
FIG. 17 is a flowchart illustrating a registration information specifying process performed by the authentication apparatus according to the second embodiment.

Next, a description will be given of a registration information specifying process performed by the registration information specifying unit 45, with reference to FIGS. 17 through 21. FIG. 17 is a flowchart illustrating a registration information specifying process performed by the authentication apparatus 20 according to the second embodiment. FIG. 18 illustrates an example of a registration database generated by the authentication apparatus 20 according to the second embodiment. FIGS. 19 and 20 illustrate examples of a biometric information list generated by the authentication apparatus 20 according to the second embodiment. FIG. 21 illustrates an example of a wound information list generated by the authentication apparatus 20 according to the second embodiment.

The registration information specifying process is a process performed by the registration information specifying unit 45 after the wound determination unit 44 extracts wound information.

(Step S51) The registration information specifying unit 45 acquires the extracted biometric information and wound information.

(Step S52) The registration information specifying unit 45 determines whether the proportion of the wound information in the total information amount of the biometric information and the wound information is in a predetermined range. If the registration information specifying unit 45 determines that the proportion of the wound information is in the predetermined range, the process proceeds to Step S53. On the other hand, if the registration information specifying unit 45 determines that the proportion of the wound information is not in the predetermined range, the process proceeds to Step S55.

(Step S53) The registration information specifying unit 45 determines whether the biometric information has a predetermined information amount. If the registration information specifying unit 45 determines that the biometric information has a predetermined information amount, the process proceeds to Step S54. On the other hand, if the registration information specifying unit 45 determines that the biometric information does not have a predetermined information amount, the process proceeds to Step S55.

(Step S54) The registration information specifying unit 45 specifies the biometric information and the wound information that satisfy registration criteria as a registration object to be registered in the registration information database 48.

(Step S55) The registration information specifying unit 45 does not specify the biometric information and the wound information that do not satisfy registration criteria as a registration object to be registered in the registration information database 48.

(Step S56) The registration information specifying unit 45 determines whether to set a validity period for the biometric information and the wound information specified as a registration object. The determination of whether to set a validity period is made on the basis of a preset setting indicating whether to enable or disable the validity period setting. If the registration information specifying unit 45 determines to set a validity period, the process proceeds to Step S57. On the other hand, if the registration information specifying unit 45 determines no to set a validity period, the registration information specifying process is ended.

It is to be noted that the determination of whether to set a validity period may be made on the basis of the type and information amount of wound information. Alternatively, the determination of whether to set a validity period may be made by asking a third party other than the user (e.g., a person who can judge the validity of registration information, such as a bank teller) whether a validity period needs to be set.

(Step S57) The registration information specifying unit 45 sets a validity period for the biometric information and the wound information specified as a registration object, and the registration information specifying process is ended. Thus, the authentication apparatus 20 can prompt registration of higher accuracy biometric information when a change in the biometric information source part that is temporary for the living body is eliminated. Further, in the case where there is a change in another portion in the biometric information source part at the time of performing verification using the registration information including the wound information, it is possible to prevent a reduction in verification accuracy due to accumulation of temporary changes in the biometric information source part.

The validity period may be a fixed value (a preset value) such as two weeks, or may be a variable value that varies in accordance with the type and information amount of wound information. Alternatively, the validity period may be a value entered by a third party other than the user (e.g., a person who can judge the validity of registration information, such as a bank teller) by asking the third party to enter a validity period.

The registration unit 46 registers the biometric information and the wound information that are specified by the registration information specifying unit 45 as a registration object to be registered to the registration information database 48. For example, the registration unit 46 registers the biometric information and the wound information in a registration database 48a.

The registration database 48a records user ID, registration date, left/right, biometric information, biometric information ID, wound information, and wound information ID. The user ID is information that uniquely identifies the user. The registration date is information that specifies the date on which verification information (biometric information and wound information) are registered. The registration database 48a may set a validity period for the verification information on the basis of the registration date. Left/right is information that indicates which of the palm of the left hand or the palm of the right hand is used for verification.

The biometric information indicates the number of veins that correspond to the feature amount of the vein information as biometric information which is a usual registration object. The biometric information ID is identification information that uniquely identifies the biometric information of each user. The details of the biometric information are recorded in association with the biometric information ID in a biometric information list 48b or a biometric information list 48c.

The wound information indicates the number of abnormal regions that are determined to be wounds. The wound information ID is identification information that uniquely identifies the wound information of each user. The details of the wound information are recorded in association with the wound information ID in a wound information list 48d.

In the biometric information list 48b, the biometric information (veins) is recorded as a collection of line segments on a per vein basis. More specifically, in the biometric information list 48b, the biometric information ID, the vector ID, the number of lines, points (P1, P2, . . . ) as the edge points and the nodes of the line segments are recorded.

The vector ID is identification information that uniquely identifies each of the veins serving as the biometric information. The number of lines is the number of line segments in the case where the vein is approximated as a union of line segments. Each line segment is represented, as a vector of each point, by the positional coordinates (x-coordinated and y-coordinate) and the magnitude (t). Thus, the shape of the vein is roughly reproduced by sequentially connecting point P1, point P2, point 3, . . . , to one another.

For example, the user ID "u0001" has 100 pieces of biometric information (veins), and the biometric information of the user ID "u0001" has a biometric information ID "S1". The biometric information ID "S1" has a vector ID "v00001", a vector ID "v00002", . . . , and an vector ID "v00100" that specify the respective 100 pieces of biometric information (veins). The vein identified by the vector ID "v00001" is represented by 10 line segments, which are represented by P1 "x1a, y1a, t1a", P2 "x1b, y1b, t1b", . . . , respectively.

The representation of the biometric information (veins) is not limited to representation by vectors. For example, the biometric information may be represented as a collection of edge points and nodes. In this case, the biometric information list 48c may be used in place of the biometric information list 48b.

In the biometric information list 48c, the biometric information (veins) is recorded as a collection of point sequences (edge points and nodes) on a per vein basis. More specifically, in the biometric information list 48c, the biometric information ID, the point sequence ID, the number of points, the edge point as a start point, the nodes as midpoints, and the edge point as an end point (start, 1st, 2nd, . . . ) are recorded.

The point sequence ID is identification information that uniquely identifies each of the veins serving as the biometric information. The number of points is the number of point sequences (edge points and nodes) forming each line segment in the case where the vein is approximated as a union of line segments. Each point sequence (start, 1st, 2nd, . . . ) represents the positional coordinates (x-coordinate and y-coordinate) in the order of connection. Thus, the shape of the vein is roughly reproduced by sequentially connecting the points to one another.

For example, the user ID "u0001" has 100 pieces of biometric information (veins), and the biometric information of the user ID "u0001" has a biometric information ID "S1". The biometric information ID "S1" has a point sequence ID "t00001", a point sequence ID "t00002", . . . , and a point sequence ID "t00100" that specify the respective 100 pieces of biometric information (veins). The vein identified by the point sequence ID "t00001" is represented by 20 point sequences, which are represented by start "x1a, y1a", 1st "x1b, y1b, t1b", . . . , respectively.

In the wound information list 48d, wound information is recorded as a collection of abnormal regions that are determined to be wounds. More specifically, in the wound information list 48d, the user ID, the error ID, error information, the number of lines, and points (P1, P2, . . . ) as the edge points and the nodes of the line segments are recorded.

The error ID is information that identifies the grounds for determining that the abnormal region is a wound. The error information is specific information that indicates the grounds for determining that the abnormal region is a wound. The number of lines is the number of line segments in the case where the wound is approximated as a union of line segments. Each line segment is represented, as a vector of each point, by the positional coordinates (x-coordinated and y-coordinate)

and the magnitude (t). Thus, the shape of a wound region is roughly reproduced by sequentially connecting point P1, point P2, point 3, . . . , to one another, so that the wound region is recognized as a rectangle incorporating a wound.

For example, the user ID "u0002" has 3 pieces of wound information (wounds), and the wound information of the user ID "u0002" has a wound information ID "K0001", a wound information ID "K0002", and a wound information ID "K0003". The wound information ID "K0001" has an error ID "E01", which indicates a histogram abnormality, for example. The wound information ID "K0001" has error information "70%", which indicates that the specific abnormal value of the histogram abnormality is 70%, for example. The wound identified by the wound ID "K0001" is represented by 5 line segments, which are represented by P1 "x1$a$, y1$a$, t1$a$", P2 "x1$b$, y1$b$, t1$b$", . . . , respectively.

Since the authentication apparatus 20 registers biometric information in the manner described above, even in the case where the user is injured at the time of registration of biometric information, it is possible to prevent a reduction in verification accuracy at the time of verification.

Figure 22:
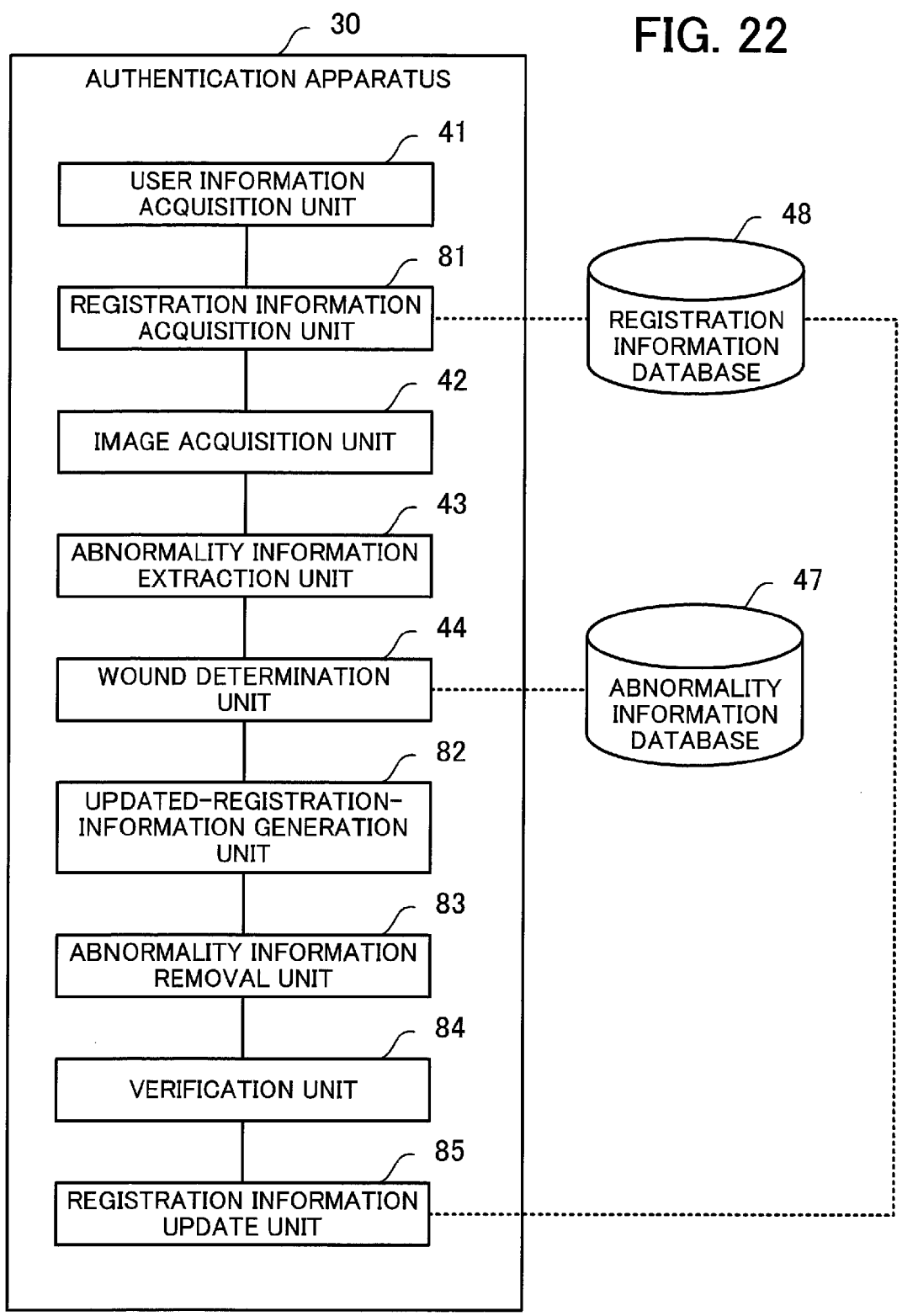
FIG. 22 illustrates the configuration of another authentication apparatus (verification apparatus) according to the second embodiment.

Next, a description will be given of the authentication apparatus 30 serving as a verification apparatus, with reference to FIG. 22. FIG. 22 illustrates the configuration of the authentication apparatus (verification apparatus) 30 according to the second embodiment.

The authentication apparatus 30 is a verification apparatus that performs one-to-one verification of biometric information. The authentication apparatus 30 includes a user information acquisition unit 41, a registration information acquisition unit 81, an image acquisition unit 42, an abnormality information extraction unit 43, a wound determination unit 44, an updated-registration-information generation unit 82, an abnormality information removal unit 83, a verification unit 84, and a registration information update unit 85. These processing units may be realized with the hardware configuration illustrated in FIG. 3. For purposes of simplicity of explanation, elements similar to those of the authentication apparatus 20 are denoted by the same reference numerals.

The user information acquisition unit 41 acquires identification information of the user.

The registration information acquisition unit 81 acquires registration information of the user from the registration information database 48 on the basis of the identification information of the user.

In order to acquire biometric information to be used for verification, the image acquisition unit 42 captures an image of the palm of the user's hand, and thereby acquires a vein image of the palm.

The abnormality information extraction unit 43 extracts, from the vein image of the palm acquired by the image acquisition unit 42, abnormality information which is different from usual biometric information.

The wound determination unit 44 compares the feature amount of a wound pattern stored in the abnormality information database 47 with the feature amount of the abnormality information so as to determine whether the abnormality information extracted by the abnormality information extraction unit 43 represents a wound.

The updated-registration-information generation unit 82 determines whether the biometric information excluding the abnormality information that is determined to represent a wound by the wound determination unit 44 is usable as updated registration information for updating the registration information of the user acquired by the registration information acquisition unit 81. If the registration information can be updated based on the determination result, the updated-registration-information generation unit 82 specifies the biometric information excluding the abnormality information that is determined to represent a wound by the wound determination unit 44 as updated registration information. The updated-registration-information generation unit 82 has one or more determination criteria for determining whether registration information can be updated. For example, the updated-registration-information generation unit 82 determines whether biometric information excluding abnormality information has a predetermined information amount (e.g., a preset information amount), and determines whether the excluded abnormality information has a predetermined proportion (e.g., a preset proportion) in the biometric information before the exclusion of the abnormality information. Thus, the updated-registration-information generation unit 82 can determine whether the biometric information excluding the abnormality information is qualified to be updated registration information on the basis of the registration information acquired by the registration information acquisition unit 81.

The abnormality information removal unit 83 removes, from the biometric information acquired by the image acquisition unit 42, biometric information located in the position corresponding to the abnormality information that is determined to represent a wound by the wound determination unit 44.

The verification unit 84 verifies the biometric information from which the abnormality information is removed by the abnormality information removal unit 83 (verification information) against the biometric information from which the abnormality information is removed by the updated-registration-information generation unit 82 (registration information). The verification unit 84 calculates a verification score using a predetermined evaluation function. Then, the verification unit 84 compares the verification score to a preset threshold so as to determine whether the verification is successful. In the case where a plurality of persons are verified, if there is a difference greater than a predetermined difference between the first place user and the second place user, the verification unit 84 may specify the first place user as a verified user. On the other hand, in the case where none of the users is verified, if there is a difference greater than a predetermined difference between the first place user and the second place user, the verification unit 84 may specify the first place user as a verified user.

In the case where verification by the verification unit 84 succeeds; where wound information is present in the biometric information in the registration information database 48 identified by the registration information acquisition unit 81; and where biometric information (healed wound information) that is determined not to be a wound by the wound determination unit 44 is present in the same position in the current verification information as the wound information; the registration information update unit 85 performs partial update by deleting the wound information from the registration information of the user stored in the registration information database 48 and by adding the biometric information (healed wound information). The case where wound information is present in the biometric information in the registration information database 48 identified by the registration information acquisition unit 81 may be the case where the user ID "u0002" illustrated in FIG. 18 has three pieces of wound information (wounds), for example.

It is to be noted that the update of the registration information of the user may be performed automatically, or may be performed with the approval of the administrator. Alternatively, in the case where wound information is contained in the registration information but the wound is healed (there is no abnormal region) at the time of verification, the registration information update unit 85 may update the registration information of the user registered in the registration information database 48 by overwriting the registration information with the entire verification information.

With the authentication apparatus 30 described above, even if there is a temporary change such as a wound in the living body, it is possible to reduce the false reject rate without increasing the false accept rate due to a reduction in the degree of similarity.

Figure 23:
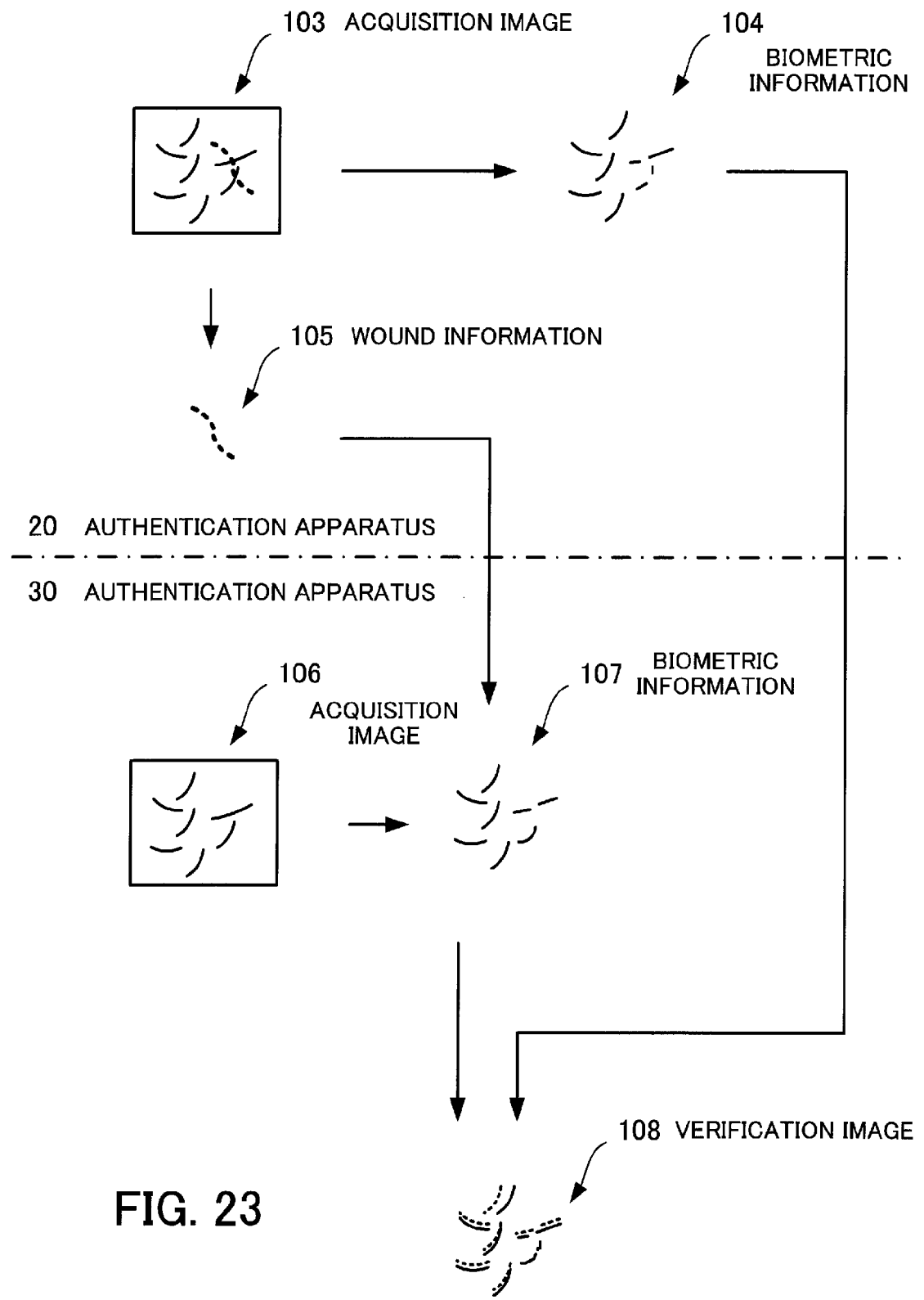
FIG. 23 illustrates an example of verification according to the second embodiment.
Figure 24:
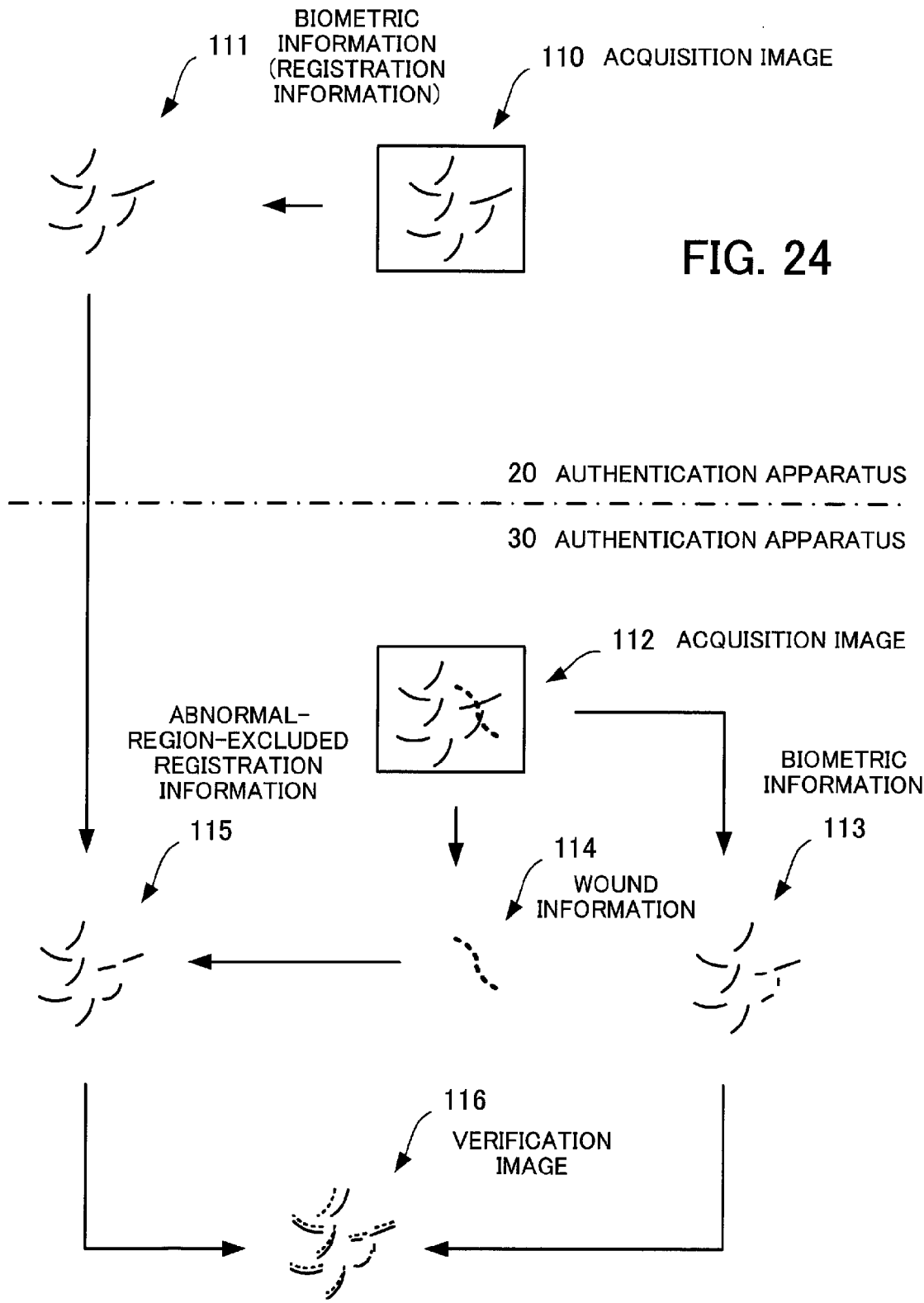
FIG. 24 illustrates another example of verification according to the second embodiment.

Next, a description will be given of examples of verification performed by the authentication apparatus 30, with reference to FIGS. 23 and 24. FIGS. 23 and 24 illustrate examples of verification according to the second embodiment.

First, a description will be given of the case where there is a wound in the palm of the user's hand at the time of registration of biometric information by the authentication apparatus (registration apparatus) 20, with reference to FIG. 23. The authentication apparatus 20 acquires an acquisition image 103 containing a wound (broken lines). The authentication apparatus 20 specifies biometric information 104 excluding biometric information located in an abnormal region as registration information to be used for verification. In this step, in order to exclude biometric information located in the abnormal region from biometric information acquired at the time of verification, the authentication apparatus 20 also specifies wound information 105 as registration information.

The authentication apparatus (verification apparatus) 30 performs verification on the basis of the registration information generated by the authentication apparatus 20. The time when the authentication apparatus 30 performs verification does not always match the time when the registration information is generated by the authentication apparatus 20. Accordingly, even though the wound information 105 is contained in the registration information, the wound in the living body may be healed at the time of verification by the authentication apparatus 30. That is, the authentication apparatus 30 may acquire an acquisition image 106 in which the wound is not present (the wound is healed). In this case, the authentication apparatus 30 extracts biometric information 107 excluding the biometric information located in an abnormal region on the basis of the wound information 105 contained in the registration information, and specifies the biometric information 107 as a verification object to be verified against the biometric information 104. Thus, the authentication apparatus 30 can perform verification while excluding the biometric information located in the abnormal region as illustrated in a verification image 108.

In this way, even if there is a wound in the living body that can be healed at the time of registration of registration information, the authentication apparatus 20 can register the registration information without making any modification. Further, the authentication apparatus 30 can perform verification at high accuracy even if a wound that was present at the time of registration is healed at the time of verification. Further, in the case where verification succeeds, the authentication apparatus 30 may update the registration information to the registration information not containing the wound information by using the verification information obtained at the time of verification.

Next, a description will be given of the case where there is no wound in the palm of the user's hand at the time of registration of biometric information by the authentication apparatus (registration apparatus) 20, but there is a wound in the palm of the user's hand at the time of verification of biometric information by the authentication apparatus (verification apparatus) 30, with reference to FIG. 24. The authentication apparatus 20 acquires in advance an acquisition image 100 in which there is no wound, and registers biometric information (registration information) 111 not containing wound information.

The authentication apparatus 30 acquires an acquisition image 112 containing a wound (broken lines), and uses biometric information 113 excluding biometric information located in an abnormal region for verification. In this step, in order to exclude biometric information located in the abnormal region from the registered biometric information (registration information) 111, the authentication apparatus 30 extracts wound information 114.

The authentication apparatus 30 excludes biometric information located in the abnormal region from the biometric information (registration information) 111 based on the wound information 114, and thereby obtains abnormal-region-excluded registration information 115 excluding the abnormal region. The authentication apparatus 30 verifies the abnormal-region-excluded registration information 115 against the biometric information 113. Thus, the authentication apparatus 30 can perform verification while excluding the biometric information located in the abnormal region as illustrated in a verification image 116.

In this way, the authentication apparatus 30 can perform verification at high accuracy even if a wound that was not present at the time of registration is present at the time of verification.

In the above description, the authentication apparatus 20 serves as a registration apparatus, and the authentication apparatus 30 serves as a verification apparatus. However, each of the authentication apparatuses 20, 30 and 32 can serve as a registration apparatus and a verification apparatus. For example, the authentication apparatus 30 may serve as an authentication apparatus when operating as an ATM in ordinary business, and may serve as a registration apparatus in specific cases. The same applies to the authentication apparatuses 20 and 32.

Figure 25:
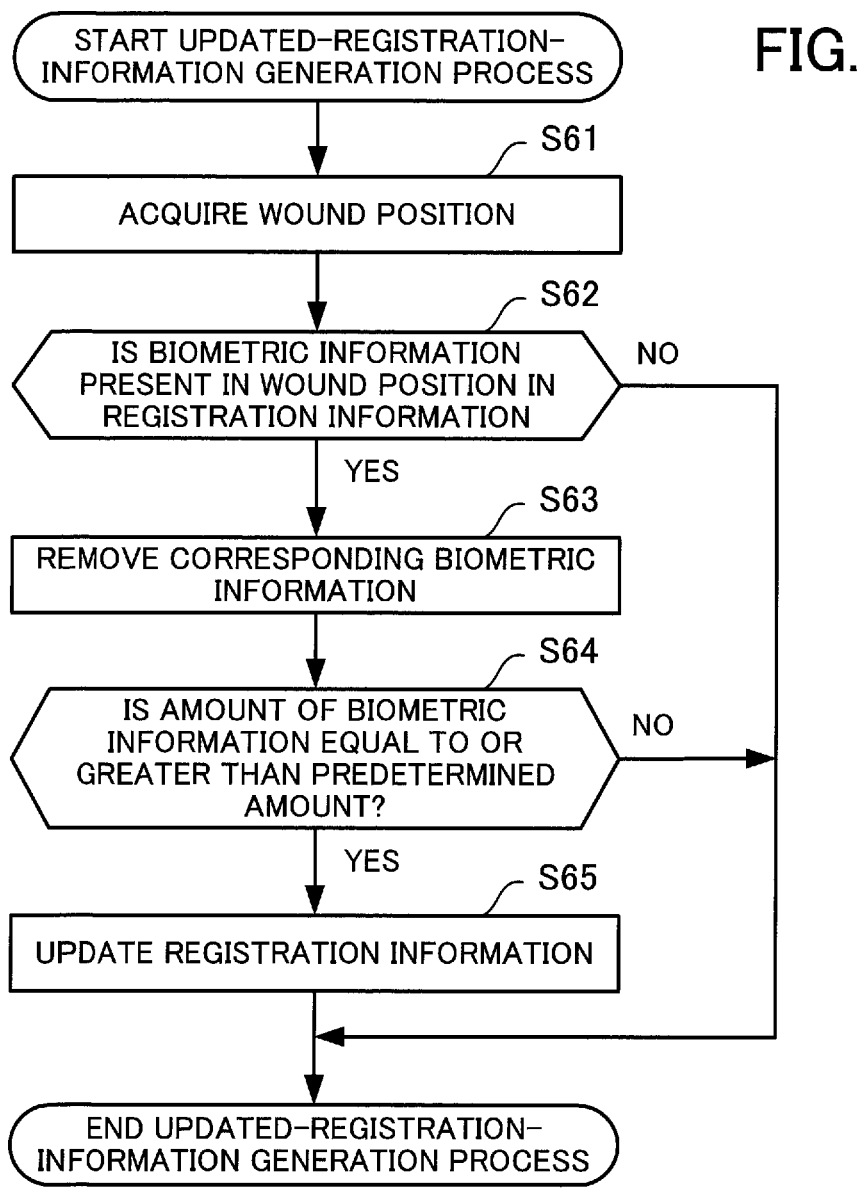
FIG. 25 is a flowchart illustrating an updated-registration-information generation process performed by the authentication apparatus according to the second embodiment.

Next, a description will be given of examples of updated-registration-information generation process performed by the updated-registration-information generation unit 82, with reference to FIG. 25. FIG. 25 is a flowchart illustrating an updated-registration-information generation process performed by the authentication apparatus 30 according to the second embodiment.

(Step S61) The updated-registration-information generation unit 82 acquires a wound position (abnormality information determined to represent a wound) obtained at the time of verification.

(Step S62) The updated-registration-information generation unit 82 determines whether biometric information is present in the wound position in the registration information of the user. If the updated-registration-information generation unit 82 determines that biometric information is present in the wound position in the registration information of the user, the process proceeds to Step S63. On the other hand, if the updated-registration-information generation unit 82 determines that biometric information is not present in the wound position, the updated-registration-information generation process is ended.

(Step S63) The updated-registration-information generation unit 82 removes, from the registration information of the user, the biometric information located in a position corresponding to the wound position obtained at the time of verification.

(Step S64) The updated-registration-information generation unit 82 determines whether the information amount of the biometric information remaining after the removal of the biometric information located in the position corresponding to the wound position obtained at the time of verification is equal to or greater than a predetermined amount. If the updated-registration-information generation unit 82 determines that the information amount of the biometric information remaining after the removal of the biometric information located in the position corresponding to the wound position obtained at the time of verification is equal to or greater than the predetermined amount, the process proceeds to Step S65. On the other hand, if the updated-registration-information generation unit 82 determines that the information amount is less than the predetermined amount, the updated-registration-information generation process is ended.

(Step S65) The updated-registration-information generation unit 82 specifies the biometric information remaining after the removal of the biometric information located in the position corresponding to the wound position obtained at the time of verification as updated registration information to be used for verification.

(C) Third Embodiment

Figure 26:
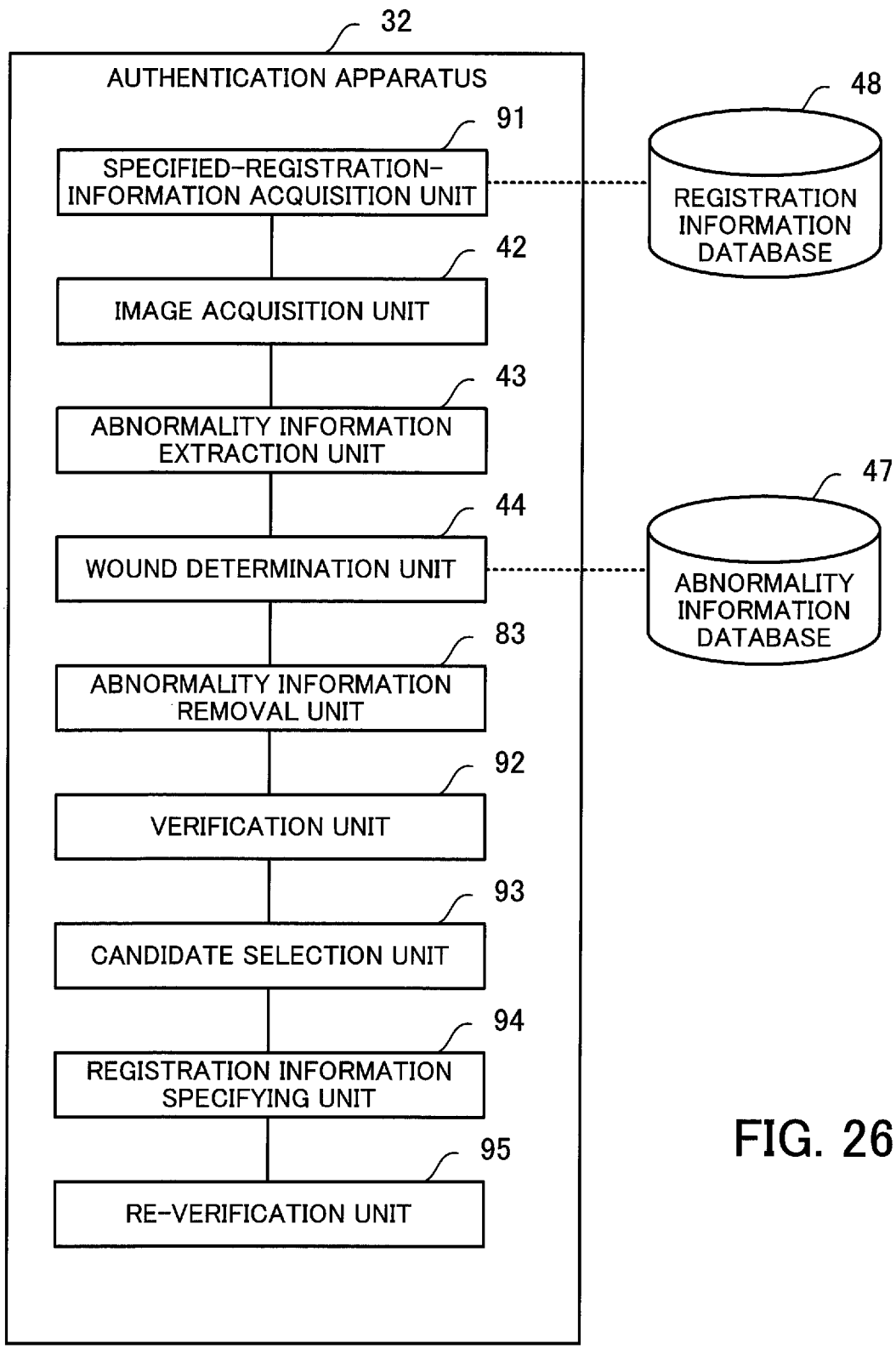
FIG. 26 illustrates the configuration of an authentication apparatus (verification apparatus) according to a third embodiment.

Next, a description will be given of the authentication apparatus 32 serving as a verification apparatus, with reference to FIG. 26. FIG. 26 illustrates the configuration of the authentication apparatus (verification apparatus) 32 according to a third embodiment.

The authentication apparatus 32 is a verification apparatus that performs one-to-N verification of biometric information. The authentication apparatus 32 includes a specified-registration-information acquisition unit 91, an image acquisition unit 42, an abnormality information extraction unit 43, a wound determination unit 44, an abnormality information removal unit 83, a verification unit 92, a candidate selection unit 93, a registration information specifying unit 94, and a re-verification unit 95. These processing units may be realized with the hardware configuration illustrated in FIG. 4. For purposes of simplicity of explanation, elements similar to those of the authentication apparatus 20 or the authentication apparatus 30 are denoted by the same reference numerals.

The specified-registration-information acquisition unit 91 acquires registration information of a specified user from the registration information database 48. For example, in the case of the room access control system, if there is a user who is permitted to have access to a particular room, the user permitted to have access to the room may be identified as a specified user. Also, a user who is determined to be a frequent user of the room on the basis of the usage history may be identified as a specified user. On the other hand, a user staying in the room is excluded from specified users. Also, a user with a positional inconsistency (e.g., a user who just opened or closed a door that is located away by a certain distance is excluded from specified users.

In the case of the ATM, a user who is not on the transfer destination lists of the respective users is excluded from specified users. It is to be noted that, if there is no specified user, the specified-registration-information acquisition unit 91 acquires registration information of all the users registered in the registration information database 48.

In order to acquire biometric information to be used for verification, the image acquisition unit 42 captures an image of the palm of the user's hand, and thereby acquires a vein image of the palm.

The abnormality information extraction unit 43 extracts, from the vein image of the palm acquired by the image acquisition unit 42, abnormality information which is different from usual biometric information.

The wound determination unit 44 compares the feature amount of a wound pattern stored in the abnormality information database 47 with the feature amount of the abnormality information extracted by the abnormality information extraction unit 43 so as to determine whether the abnormality information extracted by the abnormality information extraction unit 43 represents a wound.

The abnormality information removal unit 83 removes, from the biometric information of the user acquired by the image acquisition unit 42, biometric information corresponding to the abnormality information that is determined to represent a wound by the wound determination unit 44.

The verification unit 92 verifies the biometric information from which the abnormality information is removed by the abnormality information removal unit 83 (verification information) against the biometric information acquired by the specified-registration-information acquisition unit 91 (registration information). The verification unit 92 calculates a verification score using a predetermined evaluation function. Then, the verification unit 84 compares the verification score to a preset threshold so as to determine whether the verification is successful. The verification unit 92 specifies the verified biometric information (registration information) as a verified user.

On the other hand, in the case where none of the users is verified, if there is a difference greater than a predetermined difference between the first place user and the second place user, the verification unit 92 may specify the first place user as a verified user. Alternatively, the verification unit 92 may specify the biometric information (registration information) having a verification score in a range within a second threshold as a verified user.

The candidate selection unit 93 sorts a plurality of verification scores calculated by the verification unit 92 in ascending or descending order so as to extract one or more candidates for a valid individual. Upon extraction of a candidate for a valid individual, a single user corresponding to a verification score indicating the highest degree of agreement may be extracted. Alternatively, a plurality of users corresponding to a plurality of verification scores in a predetermined threshold range may be extracted. If the number of the plurality of users is less than a predetermined number, a plurality of users corresponding to a plurality of verification scores that are not in the predetermined threshold range may also be extracted.

The registration information specifying unit removes, from biometric information (registration information) of one or each one of the verified users selected as the candidates by the candidate selection unit 93, biometric information located in the same position as the biometric information (verification information) from which abnormality information is removed by the abnormality information removal unit 83. Then, the registration information specifying unit 94 specifies these pieces of biometric information as registration information to be used for re-verification.

The re-verification unit 95 verifies the biometric information from which the abnormality information is removed by the abnormality information removal unit 83 (verification information) against the registration information specified by the registration information specifying unit 94. The re-verification unit 95 calculates a verification score using a predetermined evaluation function.

Usually, if there is a temporary change such as a wound in the living body, the false reject rate and false accept rate increase due to a reduction in the degree of similarity, and therefore the authentication accuracy decreases. However, since the authentication apparatus 30 described above excludes only the abnormality information from the verification object, it is possible to prevent abnormality information from being mistaken for biometric information, and to perform verification while reducing the amount of biometric information to be excluded. This may reduce or prevent a drop in the authentication accuracy.

The above-described processing functions may be implemented on a computer system. To achieve this implementation, the instructions describing the functions of the authentication apparatus 20, the authentication apparatus 30, the authentication apparatus 32, and the authentication server 35 are encoded and provided in the form of computer programs. A computer system executes those programs to provide the processing functions discussed in the preceding sections. The programs may be stored in a computer-readable recording medium (including a portable recording medium). Examples of computer-readable recording media include magnetic storage devices, optical discs, magneto-optical storage media, and semiconductor memory devices. Examples of magnetic storage devices include hard disk drives (HDDs), flexible disks (FDs), and magnetic tapes. Examples of optical discs include digital versatile discs (DVDs), DVD-RAMs, CD-ROMs, and compact disc-recordable/rewritables (CD-R/RWs). Examples of magneto-optical storage media include magneto-optical disks (MOs).

Portable storage media, such as DVD and CD-ROM, are used for distribution of program products. Network-based distribution of software programs may also be possible, in which case several master program files are made available on a server computer for downloading to other computers via a network.

A computer stores software components in its local storage unit, which have previously been installed from a portable storage medium or downloaded from a server computer. The computer executes programs read out of the local storage unit, thereby performing the programmed functions. Where appropriate, the computer may execute program codes read out of a portable storage medium, without installing them in its local storage unit. Alternatively, the computer may download programs from a server computer, and execute the programs upon delivery.

According to the verification object specifying apparatus, the verification object specifying program, and the verification object specifying method described above, even if there is a change in a biometric information source part, it is possible to prevent a reduction in verification accuracy.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A verification object specifying apparatus comprising:
   a memory configured to store biometric information acquired from a biometric information source part; and
   one or more processors configured to perform a procedure including:
   detecting an abnormal portion in the biometric information source part on the basis of the biometric information, and
   determining whether biometric information located in the abnormal portion is to be included in a verification object, and specifying biometric information to be used as the verification object on the basis of a result of the determination,
   wherein the determining specifies the biometric information excluding the biometric information located in the abnormal portion as the verification object, when the detected abnormal portion is determined to be a temporary abnormality for a living body.

2. The verification object specifying apparatus according to claim 1, wherein the determining specifies the biometric information excluding the biometric information located in the abnormal portion as the verification object, when the biometric information excluding the biometric information located in the abnormal portion has a predetermined information amount.

3. The verification object specifying apparatus according to claim 1, wherein the procedure further includes verifying the biometric information specified as the verification object against preregistered biometric information.

4. The verification object specifying apparatus according to claim 3, wherein the procedure further includes registering, as biometric information to be used for verification, the biometric information specified as the verification object.

5. A verification object specifying apparatus comprising:
   a memory configured to store biometric information acquired from a biometric information source part; and
   one or more processors configured to perform a procedure including:
   detecting an abnormal portion in the biometric information source part on the basis of the biometric information, and
   determining whether biometric information located in the abnormal portion is to be included in a verification object, and specifying biometric information to be used as the verification object on the basis of a result of the determination,
   wherein the procedure further includes registering, as biometric information to be used for verification, the biometric information specified as the verification object, and
   wherein the procedure further includes setting a validity period to the biometric information specified as the verification object.

6. A verification object specifying apparatus comprising:
   a memory configured to store biometric information acquired from a biometric information source part; and
   one or more processors configured to perform a procedure including:
   detecting an abnormal portion in the biometric information source part on the basis of the biometric information, and
   determining whether biometric information located in the abnormal portion is to be included in a verification object, and specifying biometric information to be used as the verification object on the basis of a result of the determination,
   wherein the procedure further includes registering, as biometric information to be used for verification, the biometric information specified as the verification object, and wherein the registering registers the biometric information excluding the biometric information located in the abnormal portion.

7. A non-transitory computer-readable storage medium storing a computer program, the computer program causing a computer to perform a procedure comprising:

detecting an abnormal portion in a biometric information source part on the basis of biometric information acquired from the biometric information source part;

determining whether biometric information located in the abnormal portion is to be included in a verification object; and specifying biometric information to be used as the verification object on the basis of a result of the determination, wherein the determining specifies the biometric information excluding the biometric information located in the abnormal portion as the verification object, when the detected abnormal portion is determined to be a temporary abnormality for a living body.

8. A verification object specifying method comprising:

detecting, by a processor, an abnormal portion in a biometric information source part on the basis of biometric information acquired from the biometric information source part;

determining, by the processor, whether biometric information located in the abnormal portion is to be included in a verification object; and specifying, by the processor, biometric information to be used as the verification object on the basis of a result of the determination, wherein the determining specifies the biometric information excluding the biometric information located in the abnormal portion as the verification object, when the detected abnormal portion is determined to be a temporary abnormality for a living body.

* * * * *